United States Patent
Kobayashi et al.

(10) Patent No.: US 10,818,018 B2
(45) Date of Patent: Oct. 27, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Masaaki Kobayashi, Chofu (JP); Tomohiro Nishiyama, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 15/818,006

(22) Filed: Nov. 20, 2017

(65) Prior Publication Data

US 2018/0144485 A1 May 24, 2018

(30) Foreign Application Priority Data

Nov. 24, 2016 (JP) .................................. 2016-228295
Dec. 26, 2016 (JP) .................................. 2016-251918

(51) Int. Cl.
*G06K 9/00* (2006.01)
*G06T 7/285* (2017.01)
(Continued)

(52) U.S. Cl.
CPC .............. *G06T 7/285* (2017.01); *G06T 3/40* (2013.01); *G06T 7/13* (2017.01); *G06T 7/246* (2017.01);
(Continued)

(58) Field of Classification Search
CPC .. G06T 3/40; G06T 7/13; G06T 7/285; G06T 2207/10016; G06T 7/246; G06T 7/269
See application file for complete search history.

(56) References Cited

U.S. PATENT DOCUMENTS

| 9,402,025 B2 | 7/2016 | Kobayashi |
| 9,536,169 B2 | 1/2017 | Kobayashi |

(Continued)

FOREIGN PATENT DOCUMENTS

| JP | H09-0178764 A | 7/1997 |
| JP | 2001-148012 A | 5/2001 |
| WO | 2006/075394 A1 | 7/2006 |

OTHER PUBLICATIONS

Hironobu Fujiyoshi et al., "Gradient-Based Image Local Features," Journal of the Japan Society for Precision, Oct. 2011, pp. 1109-1116, vol. 77, No. 12, together with English translation.
(Continued)

Primary Examiner — Tom Y Lu
(74) Attorney, Agent, or Firm — Carter, DeLuca & Farrell LLP

(57) ABSTRACT

One or more motion vectors is specified in ascending order of a difference between a pixel value at a position C in $I_1$ [lv] and a pixel value at a position separated, in accordance with a corresponding motion vector, from the position C in $I_2$ [lv] among motion vectors at a plurality of positions with reference to the position C in flow' [lv+1]. A flow [lv] is generated using flow"[lv+1] including, as an element at the position C, one motion vector based on the one or more motion vectors, $I_1$ [lv], and $I_2$ [lv].

20 Claims, 16 Drawing Sheets

(51) Int. Cl.
  *G06T 3/40* (2006.01)
  *G06T 7/13* (2017.01)
  *G06T 7/269* (2017.01)
  *G06T 7/246* (2017.01)

(52) U.S. Cl.
  CPC .... *G06T 7/269* (2017.01); *G06T 2207/10016* (2013.01)

(56) References Cited

U.S. PATENT DOCUMENTS

| | | | | |
|---|---|---|---|---|
| 2004/0022419 | A1* | 2/2004 | Kesaniemi | G06T 7/269 382/107 |
| 2007/0297645 | A1* | 12/2007 | Pace | G06K 9/00711 382/103 |
| 2010/0135544 | A1* | 6/2010 | Mattiuzzi | G06T 7/33 382/128 |
| 2011/0019082 | A1* | 1/2011 | Su | G06T 5/002 348/441 |
| 2017/0019654 | A1 | 1/2017 | Nishiyama | |
| 2017/0094310 | A1* | 3/2017 | Dong | H04N 19/521 |

OTHER PUBLICATIONS

Lucas, B.D. et al., "An iterative image registration technique with an application to stereo vision", Proceedings of Imaging Understanding Workshop, (1981) pp. 121-130.

Horn, B.K.P. et al., "Determining optical flow", Artificial Intelligence, (1981), vol. 17, pp. 185-203.

Fujiyoshi, Hironobu et al., "Gradient-based Image Local Features", Journal of the Japan Society for Precision Engineering, (2011), vol. 77, No. 12, pp. 1109-1116.

Bouguet, Jean-Yves, "Pyramidal Implementation of the Lucas Kanade Feature Tracker Description of the algorithm", Intel Corporation Microprocessor Research Labs, (2000), 9 pages.

Suzuki, Yuichi et al., "Motion estimation for video editing", IPSJ SIG Technical Report, Graphics and CAD Technical Report 2009-CG-135(1), Jul. 1-6, 2009.

\* cited by examiner

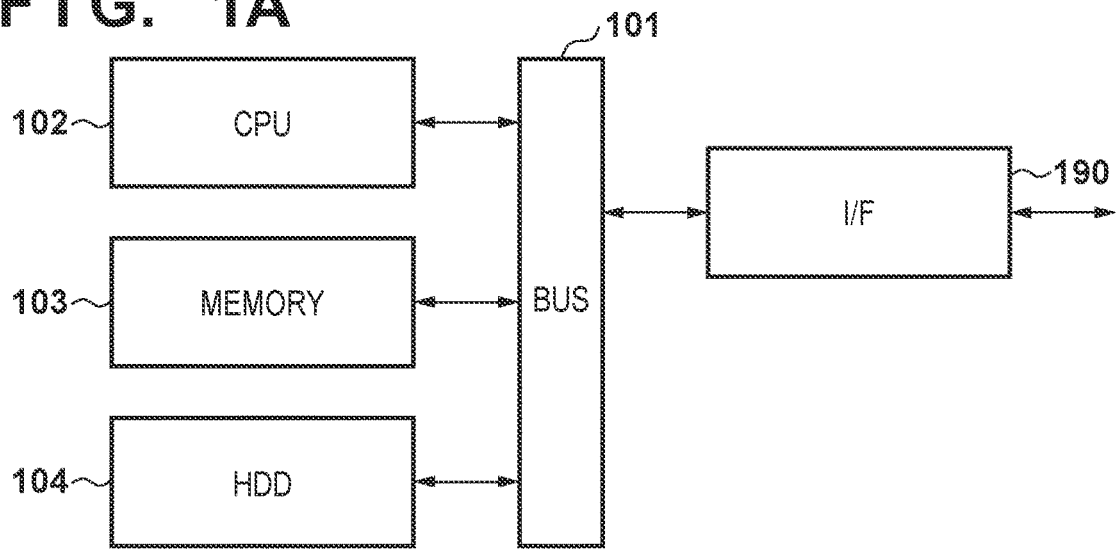
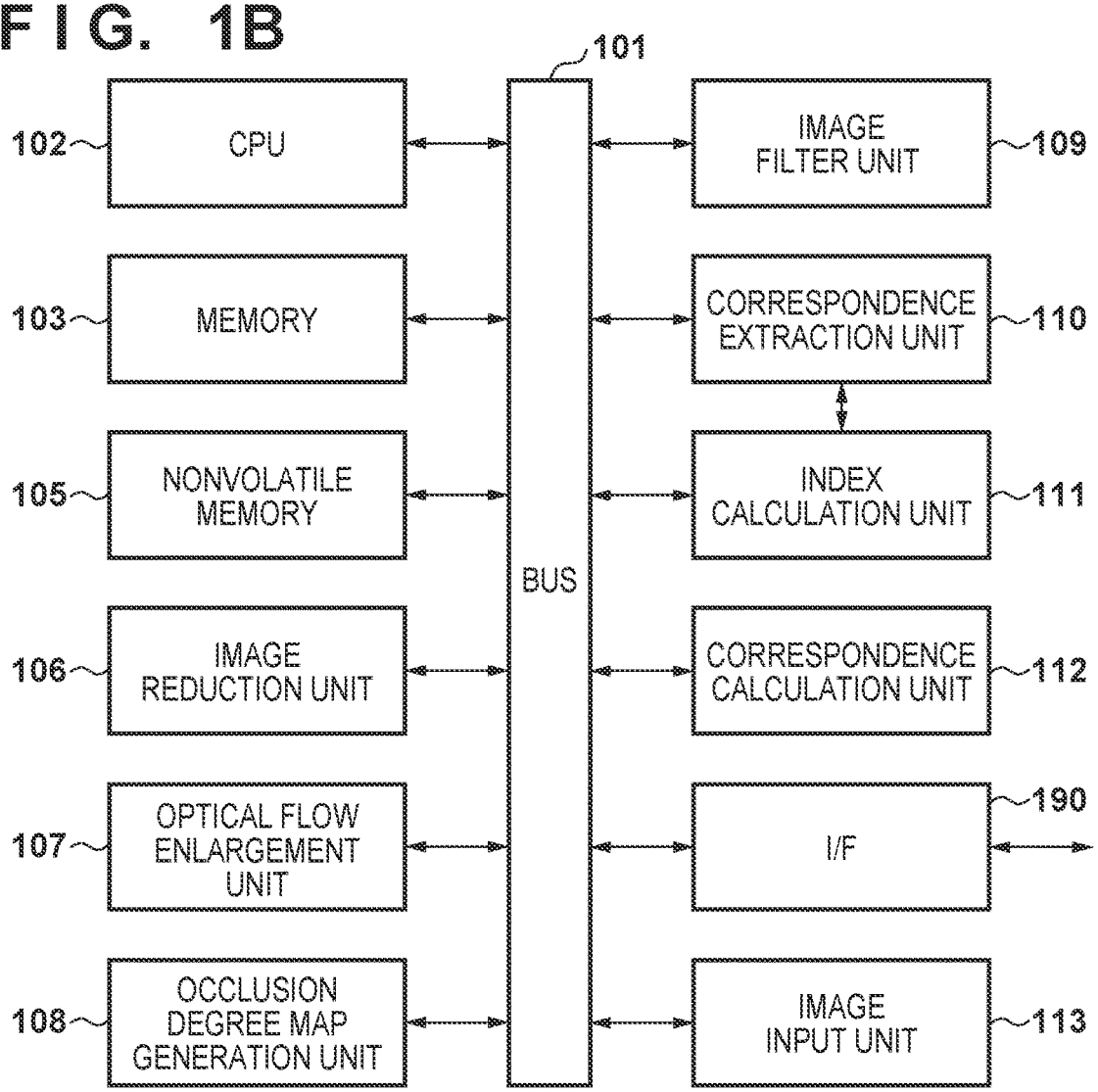

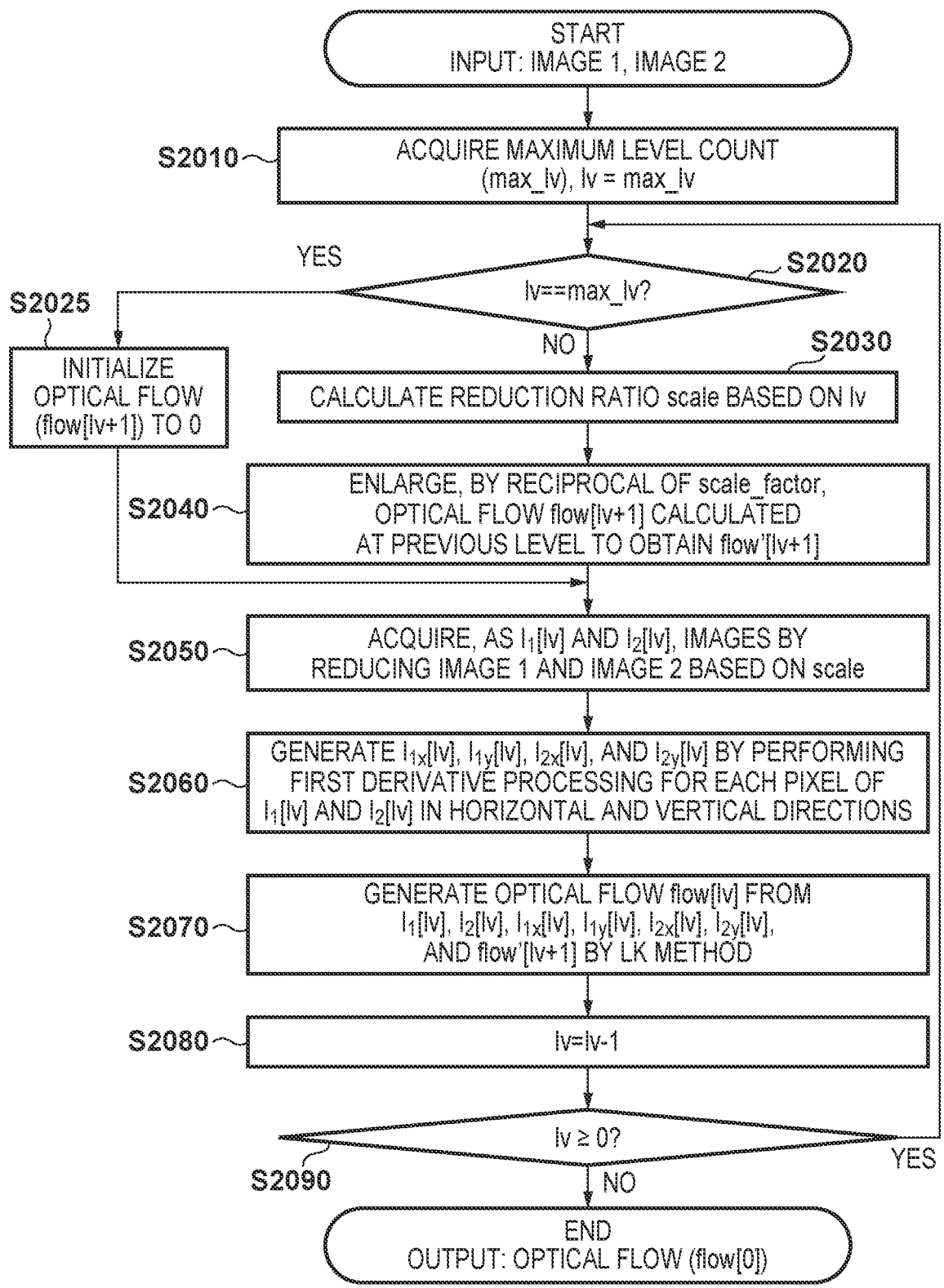

FIG. 4

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for obtaining an optical flow between images.

Description of the Related Art

In recent years, a technique of associating pixels between two images is becoming increasingly important. The correspondence indicates the relationship between a pixel of a reference image and a pixel of a test image, which is considered to be identical to the pixel of the reference image, and can be expressed by the coordinates of two points. If stereo images are input, the depth position of a pixel can be calculated based on the positional relationship between the two points, and is applicable to three-dimensional image processing. If successively sensed images (a moving image) are input and the correspondence between the images is expressed by relative coordinates, the correspondence serves as a motion vector. The use of an optical flow as a set of motion vectors enables analysis of a moving object, noise removal, camera shake correction, and the like. Note that if the shutter speed at the time of image sensing is sufficiently high, pixels are associated with each other for a moving image or stereo images, and the correspondence (motion vector) can be calculated by the same method. Examples of a method of obtaining the correspondence (motion vector) between pixels are template matching (which is also called block matching), a gradient method, and a search by feature amount comparison.

In template matching, for a pixel, a patch as a set of the pixel and its adjacent pixels is set. While shifting a search point set in a test image for each pixel of interest of a reference image, the correlation between the patch of the pixel of interest and the patch of the search point is obtained. The correspondence between the pixel of interest and the search point having the highest correlation is set as a motion vector. By scanning and processing the pixel of interest, a set of a plurality of motion vectors for the respective pixels, that is, an optical flow is obtained.

The gradient method is a method of calculating a motion vector based on the direction and magnitude of a space-time luminance change of a pixel. Since, however, it is difficult to calculate a motion vector of one pixel, for example, it is assumed that the adjacent pixels of a pixel of interest have the same motion, and a patch having the pixel of interest at the center is set to calculate a motion vector based on the average space-time luminance change of the pixels in the patch. As the gradient method, there are provided, for example, a Lucas Kanade method (to be referred to as an LK method hereinafter: B. D. Lucas and T. Kanade (1981), "An iterative image registration technique with an application to stereo vision", Proceedings of Imaging Understanding Workshop, pp. 121-130), and Horn & Schunck method (to be referred to as an HK method hereinafter: B. K. P. Horn and B. G. Schunck, "Determining optical flow", Artificial Intelligence, vol. 17, pp. 185-203, 1981).

A search by feature amount comparison is a method of expressing the feature amount of each pixel by a multidimensional vector, and associating the feature point of a pixel of interest of the reference image with a pixel, on the test image, having the small norm of the feature amount. More specifically, there are provided a SIFT method and BRIEF method, which are described in Hironobu Fujiyoshi and Mitsuru Ambai, "Gradient-based Image Local Features", Journal of the Japan Society for Precision Engineering, Vol. 77, No. 12, pp. 1109-1116, 2011.

The template matching and gradient method have a problem that it is impossible to detect a large motion or the detection accuracy is low. To solve this problem, a method called pyramid processing is often used together. The pyramid processing is a generic name for a method of preparing reduced images by reducing an input image at a plurality of reduction ratios and processing the processing result of the reduced image as an input for processing of an image of a higher resolution in an order from the smallest reduced image to the equal-magnification image. A method applying the pyramid processing to the LK method is a pyramid LK method (Pyramidal Implementation of the Lucas Kanade Feature Tracker Description of the algorithm Jean-Yves Bouguet Http://robots.stanford.edu/cs223b04/algo_tracking.pdf). Furthermore, as an example of the pyramid processing, there is provided a method described in Japanese Patent Laid-Open No. 2001-148012. In Japanese Patent Laid-Open No. 2001-148012, the reliability is evaluated for an image of each resolution (each level) of a multi-resolution image, and data with low reliability is modified for each resolution. Even if the correspondence obtained at a given resolution is erroneous, this modification processing modifies the data at the resolution, and the erroneous correspondence is difficult to be propagated to processing of a next high-resolution image.

If a large motion is detected, occlusion as a region which disappears (appears) when a moving object moves is generated. As an example of an optical flow acquisition method considering the occlusion, there is provided a method described in Yuichi Suzuki and Yasushi Yamaguchi, "Motion estimation for video editing", IPSJ SIG Technical Report, Graphics and CAD Technical Report 2009-CG-135(1), 1-6, July 2009.

In a method of detecting an optical flow using pyramid processing, the pixels of an image at a level at which the resolution is low may include the boundary of a moving object having a different motion, and the correction motions of the pixels at this time cannot be expressed. Then, if the processing result of the reduced image is processed as an input at a level at which the resolution is higher, the erroneous motions are unwantedly propagated to the next level. As a result, in the final optical flow as the processing result of the equal-magnification image, the correctness of the optical flow of the boundary of the moving object becomes low in some cases.

Note that Japanese Patent Laid-Open No. 2001-148012 describes "if evaluation of reliability and modification are not performed for each resolution, when erroneous correspondence between images at a low level is unwantedly obtained, it is impossible to modify the correspondence at a level at which the resolution is high, and thus the accuracy of a corresponding point search largely degrades". That is, the technique described in Japanese Patent Laid-Open No. 2001-148012 is a technique of evaluating the reliability for images of each resolution (each level) of a multi-resolution image, and modifying data (motion vectors) with low reliability for each resolution. Since the reliability is determined at the same level, that is, for images of a low resolution, the problem arises when "the pixels of the images at a level at which the resolution is low include the boundary of a moving object having a different motion" is not solved. Gradient methods are roughly classified into two types. The first gradient method assumes that the adjacent pixels of a pixel of interest have the same motion, and calculates an optical flow based on the average space-time luminance change of pixels in a patch having the pixel of interest at the center (to be referred to as a patch-based method hereinafter). The second gradient method weights and adds, for each pixel, the luminance difference between images and a smoothing term representing the smoothness of an optical flow, and sets the sum of the addition results of all the pixels as energy, thereby optimizing the energy (to be referred to as an energy optimization method hereinafter).

As a representative example of the patch-based method, there is provided a Lucas Kanade method (to be referred to as an LK method hereinafter) described in Pyramidal Implementation of the Lucas Kanade Feature Tracker Description of the algorithm Jean-Yves Bouguet [online] [retrieved on 2016 Nov. 7] Retrieved from the Internet: <URL:http://robots.stanford.edu/cs223b04/algo_tracking. pdf>, and International Publication No. 2006/075394 uses the same concept. Japanese patent Laid-Open No. 9-178764 uses the energy optimization method.

However, the energy optimization method represented by Japanese patent Laid-Open No. 9-178764 requires iterative calculation for energy optimization, thereby increasing the calculation amount. On the other hand, in the patch-based method represented by Pyramidal Implementation of the Lucas Kanade Feature Tracker Description of the algorithm Jean-Yves Bouguet [online] [retrieved on 2016 Nov. 7] Retrieved from the Internet: <URL:http://robots.stanford.edu/cs223b04/algo_tracking. pdf>, no iterative calculation is required, thereby making it possible to estimate an optical flow at high speed. However, since constraints are not clearly considered, the possibility that a flow vector falling outside a correct value range is estimated becomes high, thereby destabilizing estimation.

The method described in International Publication No. 2006/075394 is obtained by improving the patch-based method so as to smooth the estimated optical flow in hierarchical processing. This can suppress the appearance of a flow vector falling outside the correct value range but poses a problem that an estimated value is unstable in a region including few textures.

SUMMARY OF THE INVENTION

The present invention has been made in consideration of the above problems, and provides a technique for improving the correctness of an optical flow.

The present invention also provides a technique for estimating an optical flow at high accuracy with a small calculation amount.

According to the first aspect of the present invention, there is provided an image processing apparatus comprising: an acquisition unit configured to acquire, as a first acquisition image, each of a first image and a plurality of reduced images each obtained by reducing the first image, and acquire, as a second acquisition image, each of a second image and a plurality of reduced images each obtained by reducing the second image; a unit configured to generate a converted optical flow by converting, in accordance with a size of the currently acquired second acquisition image, an optical flow generated for the previously acquired second acquisition image; a specification unit configured to specify, among motion vectors corresponding to a plurality of pixels adjacent to a pixel at a coordinate position of interest in the converted optical flow, at least one motion vector based on a pixel value of a pixel position separated, in accordance with the corresponding motion vector, from the coordinate position of interest in the currently acquired second acquisition image and a pixel value of a pixel position corresponding to the coordinate position of interest in the first acquisition image having the same image size as that of the currently acquired second acquisition image; a generation unit configured to generate an optical flow for the currently acquired second acquisition image by generating a new optical flow having, as an element at the coordinate position of interest, one motion vector specified based on the at least one motion vector and using the new optical flow, the first acquisition image having the same image size as that of the currently acquired second acquisition image, and the currently acquired second acquisition image; and an output unit configured to output the optical flow generated for the second image by the generation unit.

According to the second aspect of the present invention, there is provided an image processing method for an image processing apparatus, comprising: acquiring, as a first acquisition image, each of a first image and a plurality of reduced images each obtained by reducing the first image, and acquiring, as a second acquisition image, each of a second image and a plurality of reduced images each obtained by reducing the second image; generating a converted optical flow by converting, in accordance with a size of the currently acquired second acquisition image, an optical flow generated for the previously acquired second acquisition image; specifying, among motion vectors corresponding to a plurality of pixels adjacent to a pixel at a coordinate position of interest in the converted optical flow, at least one motion vector based on a pixel value of a pixel position separated, in accordance with the corresponding motion vector, from the coordinate position of interest in the currently acquired second acquisition image and a pixel value of a pixel position corresponding to the coordinate position of interest in the first acquisition image having the same image size as that of the currently acquired second acqui- sition image; generating an optical flow for the currently acquired second acquisition image by generating a new optical flow having, as an element at the coordinate position of interest, one motion vector specified based on the at least one motion vector and using the new optical flow, the first acquisition image having the same image size as that of the currently acquired second acquisition image, and the currently acquired second acquisition image; and outputting the optical flow generated for the second image in the generating the optical flow.

According to the third aspect of the present invention, there is provided a non-transitory computer-readable storage medium storing a computer program for causing a computer to function as: an acquisition unit configured to acquire, as a first acquisition image, each of a first image and a plurality of reduced images each obtained by reducing the first image, and acquire, as a second acquisition image, each of a second image and a plurality of reduced images each obtained by reducing the second image; a unit configured to generate a converted optical flow by converting, in accordance with a size of the currently acquired second acquisition image, an optical flow generated for the previously acquired second acquisition image; a specification unit configured to specify, among motion vectors corresponding to a plurality of pixels adjacent to a pixel at a coordinate position of interest in the converted optical flow, at least one motion vector based on a pixel value of a pixel position separated, in accordance with the corresponding motion vector, from the coordinate position of interest in the currently acquired second acquisition image and a pixel value of a pixel position corresponding to the coordinate position of interest in the first acquisition image having the same image size as that of the currently acquired second acquisition image; a generation unit configured to generate an optical flow for the currently acquired second acquisition image by generating a new optical flow having, as an element at the coordinate position of interest, one motion vector specified based on the at least one motion vector and using the new optical flow, the first acquisition image having the same image size as that of the currently acquired second acquisition image, and the currently acquired second acquisition image; and an output unit configured to output the optical flow generated for the second image by the generation unit.

According to the fourth aspect of the present invention, there is provided an image processing apparatus comprising: an acquisition unit configured to acquire a first set including, as elements, a first image and a plurality of reduced images obtained by recursively reducing the first image at a predetermined reduction ratio, and a second set including, as elements, a second image and a plurality of reduced images obtained by recursively reducing the second image at the predetermined reduction ratio; a selection unit configured to select the images belonging to the second set in ascending order of image size; a generation unit configured to generate a moved selection image by moving each pixel of a selection image currently selected by the selection unit in accordance with a converted optical flow obtained by converting, in accordance with a size of the selection image, an optical flow corresponding to the image previously selected by the selection unit; a calculation unit configured to obtain, as an optical flow corresponding to the selection image, an optical flow which minimizes an evaluation value based on a first difference as a difference between the moved selection image and the image having the same size as that of the selection image among the images belonging to the first set and a second difference as a difference between the converted optical flow and a processed optical flow obtained by performing smoothing processing for the converted optical flow; and an output unit configured to output the optical flow corresponding to the second image, which has been obtained by the calculation unit.

According to the fifth aspect of the present invention, there is provided an image processing apparatus comprising: an acquisition unit configured to acquire a first set including, as elements, a first image and a plurality of reduced images obtained by recursively reducing the first image at a predetermined reduction ratio, and a second set including, as elements, a second image and a plurality of reduced images obtained by recursively reducing the second image at the predetermined reduction ratio; a selection unit configured to select the images belonging to the second set in ascending order of image size; a generation unit configured to generate a moved selection image by moving each pixel of a selection image currently selected by the selection unit in accordance with a converted optical flow obtained by converting, in accordance with a size of the selection image, an optical flow corresponding to the image previously selected by the selection unit; a calculation unit configured to obtain, as an optical flow corresponding to the selection image, an optical flow which minimizes an evaluation value based on a first difference as a difference between the moved selection image and the image having the same size as that of the selection image among the images belonging to the first set and a second difference as a difference between the converted optical flow and a processed optical flow obtained by converting the optical flow for the first image in accordance with the size of the selection image and then performing smoothing processing; and an output unit configured to output the optical flow corresponding to the second image, which has been obtained by the calculation unit.

According to the sixth aspect of the present invention, there is provided an image processing method for an image processing apparatus, comprising: acquiring a first set including, as elements, a first image and a plurality of reduced images obtained by recursively reducing the first image at a predetermined reduction ratio, and a second set including, as elements, a second image and a plurality of reduced images obtained by recursively reducing the second image at the predetermined reduction ratio; selecting the images belonging to the second set in ascending order of image size; generating a moved selection image by moving each pixel of a selection image currently selected in the selecting in accordance with a converted optical flow obtained by converting, in accordance with a size of the selection image, an optical flow corresponding to the image previously selected in the selecting; obtaining, as an optical flow corresponding to the selection image, an optical flow which minimizes an evaluation value based on a first difference as a difference between the moved selection image and the image having the same size as that of the selection image among the images belonging to the first set and a second difference as a difference between the converted optical flow and a processed optical flow obtained by performing smoothing processing for the converted optical flow; and outputting the optical flow corresponding to the second image, which has been obtained in the obtaining.

According to the seventh aspect of the present invention, there is provided an image processing method for an image processing apparatus, comprising: acquiring a first set including, as elements, a first image and a plurality of reduced images obtained by recursively reducing the first image at a predetermined reduction ratio, and a second set including, as elements, a second image and a plurality of reduced images obtained by recursively reducing the second image at the predetermined reduction ratio; selecting the images belonging to the second set in ascending order of image size; generating a moved selection image by moving each pixel of a selection image currently selected in the selecting in accordance with a converted optical flow obtained by converting, in accordance with a size of the selection image, an optical flow corresponding to the image previously selected in the selecting; obtaining, as an optical flow corresponding to the selection image, an optical flow which minimizes an evaluation value based on a first difference as a difference between the moved selection image and the image having the same size as that of the selection image among the images belonging to the first set and a second difference as a difference between the converted optical flow and a processed optical flow obtained by converting the optical flow for the first image in accordance with the size of the selection image and then performing smoothing processing; and outputting the optical flow corresponding to the second image, which has been obtained in the obtaining.

According to the eighth aspect of the present invention, there is provided a non-transitory computer-readable storage medium storing a computer program for causing a computer to function as: an acquisition unit configured to acquire a first set including, as elements, a first image and a plurality of reduced images obtained by recursively reducing the first image at a predetermined reduction ratio, and a second set including, as elements, a second image and a plurality of reduced images obtained by recursively reducing the second image at the predetermined reduction ratio; a selection unit configured to select the images belonging to the second set in ascending order of image size; a generation unit configured to generate a moved selection image by moving each pixel of a selection image currently selected by the selection unit in accordance with a converted optical flow obtained by converting, in accordance with a size of the selection image, an optical flow corresponding to the image previously selected by the selection unit; a calculation unit configured to obtain, as an optical flow corresponding to the selection image, an optical flow which minimizes an evaluation value based on a first difference as a difference between the moved selection image and the image having the same size as that of the selection image among the images belonging to the first set and a second difference as a difference between the converted optical flow and a processed optical flow obtained by performing smoothing processing for the converted optical flow; and an output unit configured to output the optical flow corresponding to the second image, which has been obtained by the calculation unit.

According to the ninth aspect of the present invention, there is provided a non-transitory computer-readable storage medium storing a computer program for causing a computer to function as: an acquisition unit configured to acquire a first set including, as elements, a first image and a plurality of reduced images obtained by recursively reducing the first image at a predetermined reduction ratio, and a second set including, as elements, a second image and a plurality of reduced images obtained by recursively reducing the second image at the predetermined reduction ratio; a selection unit configured to select the images belonging to the second set in ascending order of image size; a generation unit configured to generate a moved selection image by moving each pixel of a selection image currently selected by the selection unit in accordance with a converted optical flow obtained by converting, in accordance with a size of the selection image, an optical flow corresponding to the image previously selected by the selection unit; a calculation unit configured to obtain, as an optical flow corresponding to the selection image, an optical flow which minimizes an evaluation value based on a first difference as a difference between the moved selection image and the image having the same size as that of the selection image among the images belonging to the first set and a second difference as a difference between the converted optical flow and a processed optical flow obtained by converting the optical flow for the first image in accordance with the size of the selection image and then performing smoothing processing; and an output unit configured to output the optical flow corresponding to the second image, which has been obtained by the calculation unit.

Further features of the present invention will become apparent from the following description of exemplary embodiments (with reference to the attached drawings).

BRIEF DESCRIPTION OF THE DRAWINGS

FIGS. 1A and 1B are block diagrams each showing an example of the hardware arrangement of an image processing apparatus;

FIG. 2 is a flowchart illustrating a conventional optical flow calculation method;

FIG. 4 is a view showing an example of the arrangement pattern of a plurality of candidate positions;

DESCRIPTION OF THE EMBODIMENTS

Figure 3:
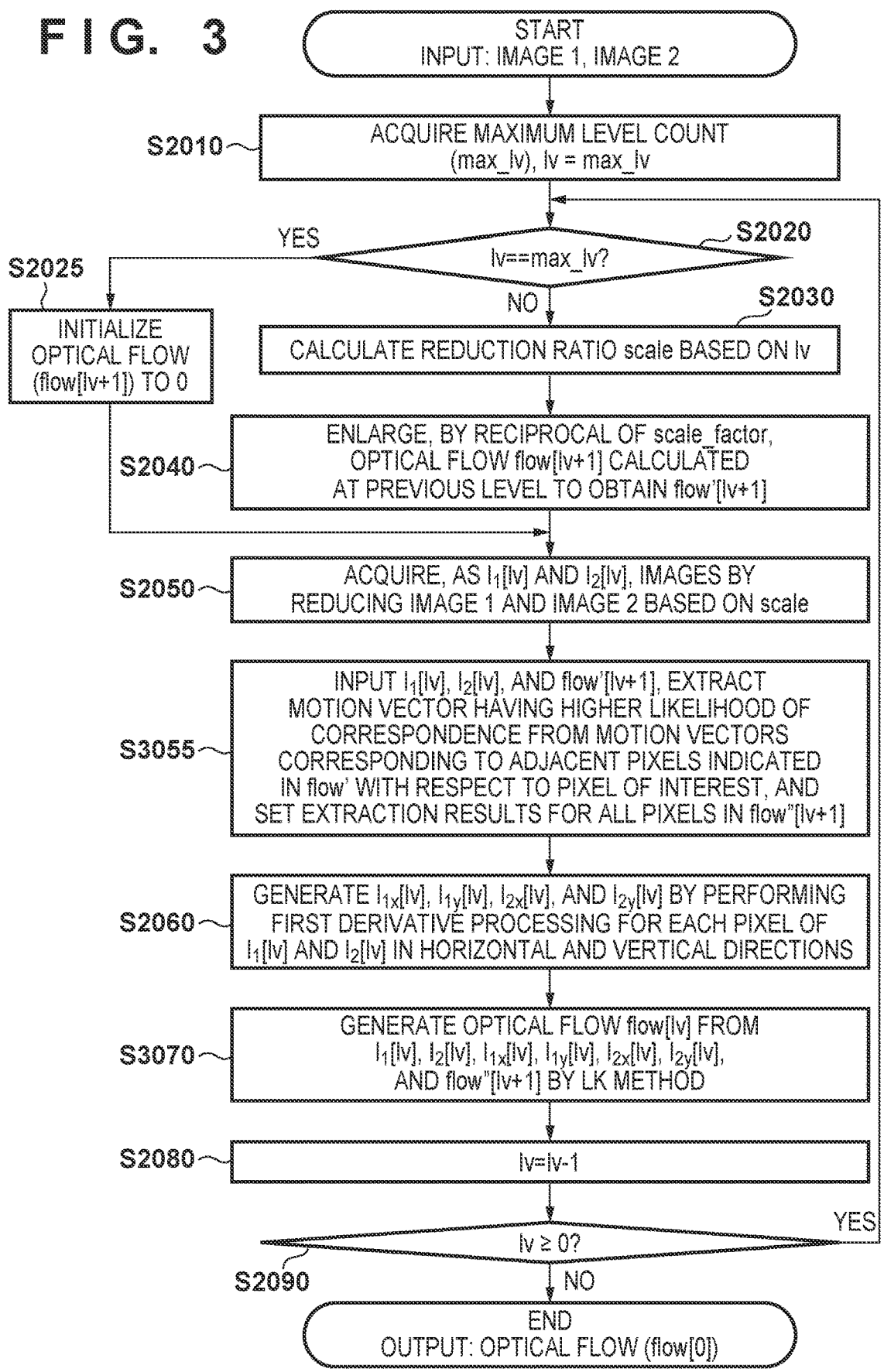
FIG. 3 is a flowchart illustrating optical flow calculation processing according to the first embodiment.

Embodiments of the present invention will be described below with reference to the accompanying drawings. Note that the embodiments to be described below are merely examples when the present invention is practiced concretely, and are practical embodiments of arrangements described in the appended claims.

First Embodiment

In this embodiment, an example of an image processing apparatus having the following arrangement will be described. This image processing apparatus acquires, as the first acquisition image, each of the first image and a plurality of reduced images obtained by reducing the first image in ascending order of image size. The image processing apparatus acquires, as the second acquisition image, each of the second image and a plurality of reduced images obtained by reducing the second image in ascending order of image size. The image processing apparatus generates a converted optical flow by converting, in accordance with the size of the currently acquired second acquisition image, an optical flow generated for the previously acquired second acquisition image. The image processing apparatus specifies, among motion vectors corresponding to a plurality of positions with reference to a coordinate position of interest in the converted optical flow, one or more motion vectors in ascending order of a difference between the pixel value of a pixel position separated, in accordance with the corresponding motion vector, from the coordinate position of interest in the currently acquired second acquisition image and the pixel value of a pixel position corresponding to the coordinate position of interest in the first acquisition image having the same image size as that of the currently acquired second acquisition image. Then, the image processing apparatus generates a new optical flow having, as an element at the coordinate position of interest, one motion vector specified based on the one or more motion vectors, and generates an optical flow for the currently acquired second acquisition image using the new optical flow, the first acquisition image having the same image size as that of the currently acquired second acquisition image, and the currently acquired second acquisition image. The image processing apparatus outputs the optical flow generated for the second image.

First, various definitions used in each of the following embodiments including this embodiment will be described. An "optical flow" (to be also referred to as an OF hereinafter) in the following description indicates a map image in which a motion vector in a target image with respect to a reference image is registered for each pixel. That is, the optical flow has a resolution (the numbers of pixels in the vertical and horizontal directions) equal to that of the reference image (target image). An element of the optical flow corresponding to each pixel of the reference image is a two-dimensional vector.

In the following description, if an image is represented by I, a pixel value at a pixel position (x, y) on the image I is represented by I(x, y). In the optical flow, an element corresponding to the pixel position (x, y) on the image I is represented by (u(x, y), v(x, y)) where u(x, y) represents the horizontal component (X component) of a motion vector corresponding to the pixel position (x, y) on the image I and v(x, y) represents the vertical component (Y component) of the motion vector corresponding to the pixel position (x, y) on the image I. Note that the pixel position (x, y) may be represented as a vector X. In this case, the pixel value at the pixel position (x, y) on the image I is represented by I(X). Similarly, in the optical flow, the element corresponding to the pixel position (x, y) on the image I is represented by (u(X), v(X)). Furthermore, in the following description, $A_x$ which is obtained by adding a subscript x to a variable A represented by a vector indicates the x component of A, and $A_y$ which is obtained by adding a subscript y to the variable A indicates the y component of A.

In this embodiment, the first image (image 1) and the second image (image 2) sensed by a single image sensing device at different times are acquired to generate an optical flow of the first image with reference to the second image. Note that the first and second images are not limited to the images sensed by the single image sensing device at different times, and may be images sensed by a plurality of image sensing devices at the same time or images sensed by a plurality of image sensing devices at different times. Furthermore, in this embodiment, the first and second images are monochromatic images, and pixel values are given by real numbers of 0 (black) to 1 (white). However, the first and second images may be color images or the like, and pixel values may be represented by 8 or 16 bits. In this embodiment, a pixel position and the components of a motion vector are dealt as real numbers. Therefore, if coordinate values are given by real numbers in the above-described notation, a pixel value calculated by bilinear interpolation or a motion vector is obtained.

All the steps of each flowchart to be described below need not be sequentially executed from above, and the ordinal numbers of some processing steps may be swapped or some processing steps may be parallelly executed.

First, an example of the hardware arrangement of an image processing apparatus according to this embodiment will be described with reference to a block diagram shown in FIG. 1A. Note that the arrangement shown in FIG. 1A is an example of an arrangement capable of implementing each process to be described later as a process to be executed by the image processing apparatus according to this embodiment. An arrangement applicable as the hardware arrangement of the image processing apparatus according to this embodiment is not limited to that shown in FIG. 1A.

A CPU 102 executes processing using computer programs and data stored in a memory 103. Then, the CPU 102 controls the overall operation of the image processing apparatus and also executes or controls each process to be described later as a process to be executed by the image processing apparatus.

The memory 103 includes an area to store a computer program and data loaded from an HDD (Hard Disk Drive) 104 and an area to store data externally received via an I/F (interface) 190. The memory 103 also includes a work area used by the CPU 102 to execute various processes. The memory 103 can appropriately provide various areas.

An OS (Operating System) and computer programs and data for causing the CPU 102 to execute or control each process to be described later as a process to be executed by the image processing apparatus are saved in the HDD 104. The data saved in the HDD 104 include data to be explained as known information in the following description. The computer programs and data saved in the HDD 104 are appropriately loaded into the memory 103 under the control of the CPU 102, and processed by the CPU 102.

The I/F 190 functions as a communication interface used by the image processing apparatus to perform data communication with an external device, and an image to be used by the image processing apparatus in the following processing is acquired from an external device via the I/F 190. The CPU 102, the memory 103, the HDD 104, and the I/F 190 are all connected to a bus 101.

Next, a conventional optical flow calculation method will be described with reference to a flowchart shown in FIG. 2. Processing according to the flowchart shown in FIG. 2 is optical flow calculation processing using the pyramid LK method. The processing according to the flowchart shown in FIG. 2 is processing for obtaining an optical flow for one image. Thus, for example, if an optical flow is obtained for each of a plurality of images, the processing according to the flowchart shown in FIG. 2 is performed for each of the plurality of images. A case in which the image processing apparatus having the arrangement shown in FIG. 1A performs the processing according to the flowchart shown in FIG. 2 will be described below. Assume that at the start of the processing according to the flowchart shown in FIG. 2, the first and second images are already stored in the memory 103 or the HDD 104.

In step S2010, the CPU 102 acquires a maximum level count (max_lv) as the number of reduced images generated from a first image $I_1$ or a second image $I_2$. The maximum level count max_lv may be preset in the image processing apparatus or input by the user. This embodiment assumes that the image $I_1$ ($I_2$) is reduced until the size (the vertical and/or horizontal size) of a reduced image obtained by reducing $I_1$ ($I_2$) max_lv times at a reduction ratio scale_factor (to be referred to as sf hereinafter: 0<sf<1) is 5% or less of the size (the vertical and/or horizontal size) of $I_1$ ($I_2$). In this case, if scale_factor=0.5, max_lv=5 is obtained, as given by:

$$\log_{scale\_factor} 0.05 = \log_{0.05} 0.05 \approx 4.3 \qquad (1)$$

In the following description, a reduced image obtained by reducing $I_1$ lv (lv is an integer within a range of 0 to max_lv) times at the reduction ratio sf is represented by $I_1$ [lv]. A reduced image obtained by reducing $I_2$ lv times at the reduction ratio sf is represented by $I_2$ [lv]. That is, $I_1 = I_1$ [0] and $I_2 = I_2$ [0]. A reduction ratio scale of $I_1$ [lv] for $I_1$ (the reduction ratio scale of $I_2$ [lv] for $I_2$) is given by:

$$scale = scale\_factor^{lv} \qquad (2)$$

That is, $I_1$ [lv] is obtained by reducing $I_1$ at the reduction ratio scale, and $I_2$ [lv] is obtained by reducing $I_2$ at the reduction ratio scale. As an example, sf=0.5 is set. However, the value of sf may be arbitrary as long as the value falls within a range of 0 (exclusive) to 1 (exclusive). Note that the size of $I_1$ [max_lv] ($I_2$ [max_lv]) should be set smaller as the motion of a motion detection target between images is larger. However, the size is desirably, appropriately set in accordance with various factors such as a processing time. At the time of image reduction processing, a bicubic method may be used or a method such as a Lanczos 3-lobed method may be used.

The CPU 102 sets max_lv in the value of the variable lv. In the following description, $I_1$ [lv] and $I_2$ [lv] may be referred to as images at the level lv, $I_1$ [0] and $I_2$ [0] may be referred to as images at the lowest level, and $I_1$ [max_lv] and $I_2$ [max_lv] may be referred to as images at the highest level.

In step S2020, the CPU 102 determines whether lv=max_lv holds. If it is determined that lv=max_lv holds, the process advances to step S2025; otherwise, the process advances to step S2030.

In step S2025, the CPU 102 initializes the values of all the elements of the optical flow at the level (max_lv+1) to 0. In the following description, an optical flow at the level lv is represented by flow [lv]. That is, the size of flow [max_lv+1] is sf times larger than the size of flow [max_lv]. The resolution of flow [lv] is equal to that of $I_1$ [lv] and $I_2$ [lv]. The process then advances to step S2050.

On the other hand, in step S2030, the CPU 102 obtains the reduction ratio scale by substituting the current value of the variable lv into equation (2). In step S2040, the CPU 102 multiplies the value of each element (the component values of each motion vector) of the optical flow (flow [lv+1]) obtained lately by 1/sf, and then generates flow' [lv+1] by enlarging the vertical/horizontal size of the optical flow by 1/sf times. In the enlargement processing, the X and Y components of the motion vector are individually processed, similarly to enlargement of an RGB image in which R, G, and B components are individually processed. For this enlargement processing, bilinear interpolation may be used or another method such as a bicubic method may be adopted.

In step S2050, the CPU 102 generates the reduced image $I_1$ [lv] by reducing the first image $I_1$ at the reduction ratio scale obtained in step S2030. Furthermore, the CPU 102 generates the reduced image $I_2$ [lv] by reducing the second image $I_2$ at the reduction ratio scale obtained in step S2030. In this embodiment, an area-average method is used as an image reduction method in which aliasing is difficult to occur. The present invention, however, is not limited to this. For example, the Lanczos 3-lobed method or the like may be used.

In step S2060, the CPU 102 generates $I_{1x}$ [lv] and $I_{1y}$ [lv] by performing first derivative processing for each pixel of $I_1$ [lv] in the horizontal and vertical directions. $I_{1x}$ [lv] and $I_{1y}$ [lv] are respectively an image obtained by applying a horizontal Sobel filter for $I_1$ [lv] and an image obtained by applying a vertical Sobel filter for $I_1$ [lv]. Similarly, the CPU 102 generates $I_{2x}$ [lv] and $I_{2y}$ [lv] by performing first derivative processing for each pixel of $I_2$ [lv] in the horizontal and vertical directions. $I_{2x}$ [lv] and $I_{2y}$ [lv] are respectively an image obtained by applying the horizontal Sobel filter for $I_2$ [lv] and an image obtained by applying the vertical Sobel filter for $I_2$ [lv]. In this embodiment, the first derivative processing is implemented by the Sobel filters. The present invention, however, is not limited to this.

In step S2070, the CPU 102 generates an optical flow flow [lv] from $I_1$ [lv], $I_2$ [lv], $I_{1x}$ [lv], $I_{1y}$ [lv], $I_{2x}$ [lv], $I_{2y}$ [lv], and flow' [lv+1] by the LK method. The LK method will now be described. For the sake of descriptive convenience, assume that $I_1=I_1$ [lv], $I_2=I_2$ [lv], $I_{1x}=I_{1x}$ [lv], $I_{1y}=I_{1y}$ [lv], $I_{2x}=I_{2x}$ [lv], and $I_{2y}=I_{2y}$ [lv].

A motion vector as an element corresponding to a coordinate position C (=(Cx, Cy)) of interest in the optical flow flow' [lv+1] is represented by u(C) (see equation (3) below).

$$u(C) = \text{flow}'[lv+1](C) \tag{3}$$

Then, a motion vector flow [lv](C) as an element corresponding to the coordinate position C of interest in flow [lv] is obtained using equation (3) above and equations (4) to (11) below.

$$A = \begin{pmatrix} \sum_i I_{2x}(C+x_i+u(C+x_i))^2 & \sum_i I_{2x}\begin{pmatrix} C+x_i+ \\ u(C))I_{2y}(C+x_i+ \\ u(C+x_i) \end{pmatrix} \\ \sum_i I_{2x}\begin{pmatrix} C+x_i+u(C+ \\ x_i))I_{2y}(C+ \\ x_i+u(C+x_i) \end{pmatrix} & \sum_i I_{2y}(C+x_i+u(C+x_i))^2 \end{pmatrix} \tag{4}$$

$$= \begin{pmatrix} \sum_i I_{2xw}(C+x_i)^2 & \sum_i I_{2xw}(C+x_i)I_{2yw}(C+x_i) \\ \sum_i I_{2xw}(C+x_i)I_{2yw}(C+x_i) & \sum_i I_{2yw}(C+x_i)^2 \end{pmatrix} \tag{5}$$

$$I_t(C) = I_1(C) - I_2(C+u(C)) \tag{6}$$

$$b = \begin{pmatrix} -\sum_i I_{2x}(C+x_i+u(C+x_i))I_t(C+x_i) \\ -\sum_i I_{2y}(C+x_i+u(C+x_i))I_t(C+x_i) \end{pmatrix} \tag{7}$$

$$= \begin{pmatrix} -\sum_i I_{2xw}(C+x_i)I_t(C+x_i) \\ -\sum_i I_{2yw}(C+x_i)I_t(C+x_i) \end{pmatrix} \tag{8}$$

$$A\begin{pmatrix} du \\ dv \end{pmatrix} = b \tag{9}$$

$$\begin{pmatrix} du \\ dv \end{pmatrix} = (A^T A)^{-1} A^T b \tag{10}$$

$$\text{flow}[lv](C) = u(C) + \begin{pmatrix} du \\ dv \end{pmatrix} \tag{11}$$

In the above equations, $\Sigma$ represents integration. This embodiment assumes that integration is performed within a region of 7 pixels×7 pixels having the pixel position of interest at the center. That is, i takes a value within a range of 0 to 48, and Xi represents the relative coordinates of the 49 pixels with respect to the pixel position of interest as the center.

Equations (4) and (7) are used to calculate A and b as intermediate data in the LK method. Equations (4) and (7) suffice to calculate A and b. However, as processing, it is also equivalent to create in advance images $I_{2xw}$ and $I_{2yw}$ by warping pixels using u and apply equations (5) and (8).

Equation (6) defines $I_t$ (C). Equation (9) represents the relationship between A, b, and the difference (du, dv)$^t$ in motion vector. Equation (10) is a deformed equation of equation (9) for directly calculating (du, dy)$^t$. Equation (11) is used to calculate a final motion vector and generate flow [lv](C). The above processing is performed by setting each pixel position of $I_1$ [lv] ($I_2$ [lv]) as the coordinate position C of interest, thereby obtaining the optical flow flow [lv].

In step S2080, the CPU 102 decrements the value of the variable lv by one. In step S2090, the CPU 102 determines whether the value of the variable lv is equal to or larger than 0. If it is determined that the value of the variable lv is equal to or larger than 0, the process advances to step S2020; otherwise, the CPU 102 outputs flow [0] generated by the above processing. Then, the processing according to the flowchart shown in FIG. 2 ends. The output destination of flow [0] is not limited to a specific one. For example, flow [0] may be output to a memory such as the memory 103 or the HDD 104, or transmitted to an external device via the I/F 190. The CPU 102 may perform some kind of image processing such as camera shake correction using the generated optical flow flow [0].

In this embodiment, as shown in FIG. 3, optical flow calculation processing using so-called template matching in combination, in which processing in step S3055 is performed between steps S2050 and S2060 in the flowchart shown in FIG. 2 and processing in step S3070 is performed instead of step S2070, is executed. The optical flow calculation processing according to this embodiment will be described using a flowchart shown in FIG. 3. In the flowchart shown in FIG. 3, the same step numbers as in FIG. 2 denote the same processing steps and a description thereof will be omitted.

In step S3055, the CPU 102 specifies, among motion vectors corresponding to a plurality of positions with reference to the coordinate position C of interest in flow' [lv+1], one or more motion vectors in ascending order of difference between the pixel value of a pixel position separated, in accordance with the corresponding motion vector, from a pixel position corresponding to the coordinate position C of interest in $I_2$ [lv] and the pixel value of a pixel position corresponding to the coordinate position C of interest in $I_1$ [lv]. Then, the CPU 102 specifies one of the one or more specified motion vectors, and sets the specified one motion vector as an element at the coordinate position C of interest in a new optical flow flow"[lv+1].

Figure 4:
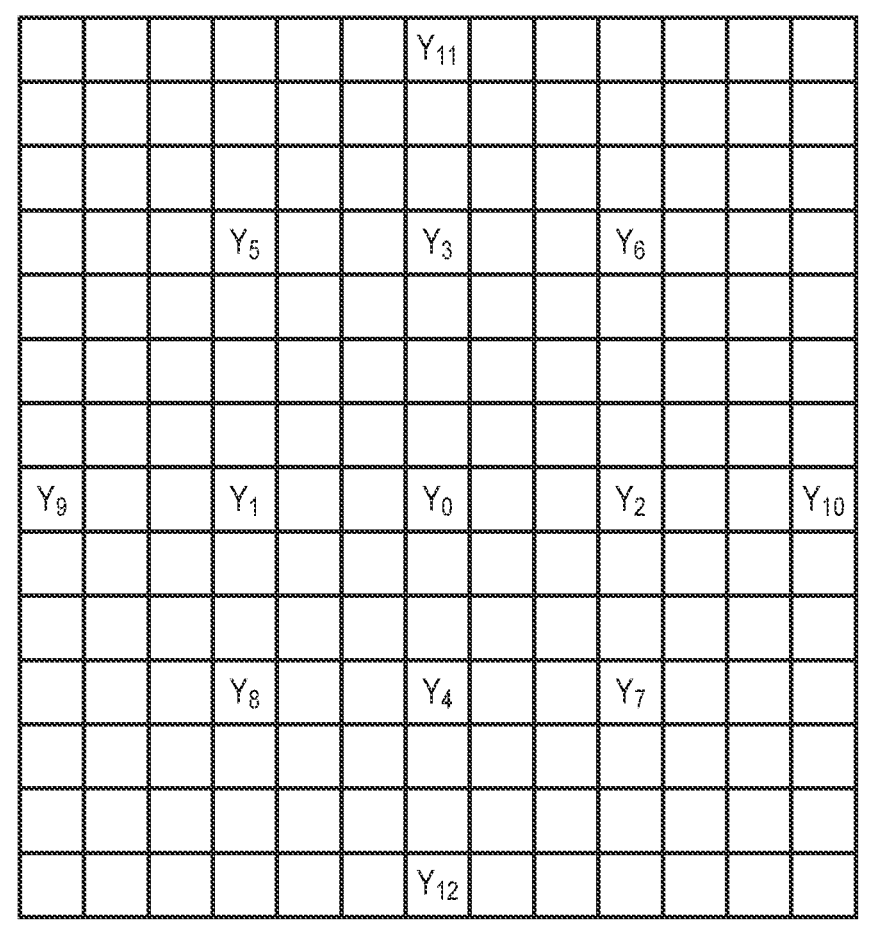

The processing in step S3055 will be described in detail below. The arrangement pattern of a plurality of candidate positions is defined, as shown in FIG. 4. Referring to FIG. 4, a candidate position Y0 is set as an origin, and candidate positions Y1 to Y12 have relative coordinates with reference to Y0. That is, the candidate position Y0=(0, 0), the candidate position Y1=(0, −3), and the candidate position Y6= (3, 3). Note that the arrangement pattern of the candidate positions is not limited to that shown in FIG. 4 but it is desirable to sufficiently roughly arrange the candidate positions. The reason for this will be described later.

First, the CPU 102 specifies one or more motion vectors in ascending order of difference using equations (12) to (14) below.

$$sad(I_a, C_a, I_b, C_b) = \sum_{dy=-r}^{r}\sum_{dx=-r}^{r} \text{abs}(I_a(C_{ax}+dx, C_{ay}+dy) - I_b(C_{bx}+dx, C_{by}+dy)) \quad (12)$$

$$\text{round}(V) = (\text{floor}(V_x + 0.5), \text{floor}(V_y + 0.5)) \quad (13)$$

$$j = \arg\min_i{}_n(sad(I_1[lv], C, I_2[lv], C + \text{round}(\text{flow}'[lv+1](C+Y_i)))) \quad (14)$$

Equation (12) is used to calculate SAD (Sum of Absolute Difference) between the pixel values of corresponding pixel positions in a patch having a vertical/horizontal size of (2r+1) with respect to the coordinate position C of interest as the center in an image Ia and a patch having a vertical/ horizontal size of (2r+1) with respect to the coordinate position C of interest as the center in an image Ib. As the SAD is smaller, the similarity between the pixels is higher. Although r=2 in this embodiment, the value of r is not limited to 2.

Equation (13) is used to obtain, when a vector V is given, an integer value by rounding off each of an x component Vx and a y component Vy of the vector V. In equation (13), Vx (Vy) is rounded off by adding 0.5 to Vx (Vy) and performing calculation using the floor function, thereby removing a fraction part. As is well known, the floor function is a function of returning the integer part of a value as an argument. In this embodiment, when calculating an SAD, coordinate values are converted into integers using a round function. However, the coordinate values may be calculated as degrees without using the round function. In this case, as described above, a pixel value is obtained by bilinear interpolation.

If the SAD between the pixel value at the coordinate position C of interest in $I_1$ [lv] and the pixel value of a pixel positions obtained by adding, to the coordinate position C of interest in $I_2$ [lv], a motion vector (the values of the components have been converted by equation (13)) at a coordinate position (C+Yi) in flow' [lv+1] is obtained for i=0 to 12, and the obtained SADs are sorted in ascending order, equation (14) returns, as j, i corresponding to the nth (n is an integer of 0 to 12) SAD from the first one (the smallest SAD, that is, the 0th SAD). This example assumes that n=0. That is, for i=0 to 12, i which minimizes the SAD is acquired as j.

That is, by equations (12) to (14) above, Yj which minimizes the SAD is obtained. Thus, it is possible to specify flow' [lv+1](C+Yj), that is, a vector which minimizes the SAD among vectors flow' [lv+1](C+Y0) to flow' [lv+1](C+Y12). Equation (15) below sets flow' [lv+1] (C+Yj) as a motion vector corresponding to the coordinate position C of interest in flow"[lv+1].

$$\text{flow}''[lv+1](C) = \text{flow}'[lv+1](C+Y_j) \quad (15)$$

By performing the above-described processing using equations (12) to (15) for all the coordinate positions C of interest, the optical flow flow"[lv+1] can be completed. Processing for obtaining i corresponding to the nth SAD in ascending order of SAD will be described with reference to a flowchart shown in FIG. 5. Note that rec[i] indicates an array of records having s and i as elements, and "." is used for the elements to be referred to.

In step S5010, the CPU 102 initializes the variable i to 0. In step S5020, the CPU 102 calculates the SAD according to the above equation, and substitutes the calculated SAD into rec[i].s. In step S5025, the CPU 102 substitutes the current value of the variable i into rec[i].i. In step S5030, the CPU 102 increments the value of the variable i by one. In step S5035, the CPU 102 determines whether the value of the variable i is smaller than 13. If it is determined that the value of the variable i is smaller than 13, the process returns to step S5020; otherwise, the process advances to step S5040. In step S5040, the CPU 102 sorts rec in ascending order. As a result, when the 0th SAD is smallest and the 12th SAD is largest, rec[k].s stores the kth SAD and rec[k].i stores the value of k. Then, rec[n].i is returned as a result of the processing according to the flowchart shown in FIG. 5. Note that if i corresponding to the smallest one of the 13 SADs is returned, the above sort processing is not essential, and i when the SAD is smallest is simply found and returned.

Note that if the value of the variable lv is max_lv, flow"[lv+1](C) may be determined in step S3055 by equation (16) below, instead of equation (15) above.

$$\text{flow"}[lv+1](C) = \text{flow'}[lv+1](C) \quad (16)$$

Referring back to FIG. 3, in step S3070, the CPU 102 performs the same processing as that in step S2070. At this time, flow"[lv+1] is used instead of flow' [lv+1].

Figure 6A:
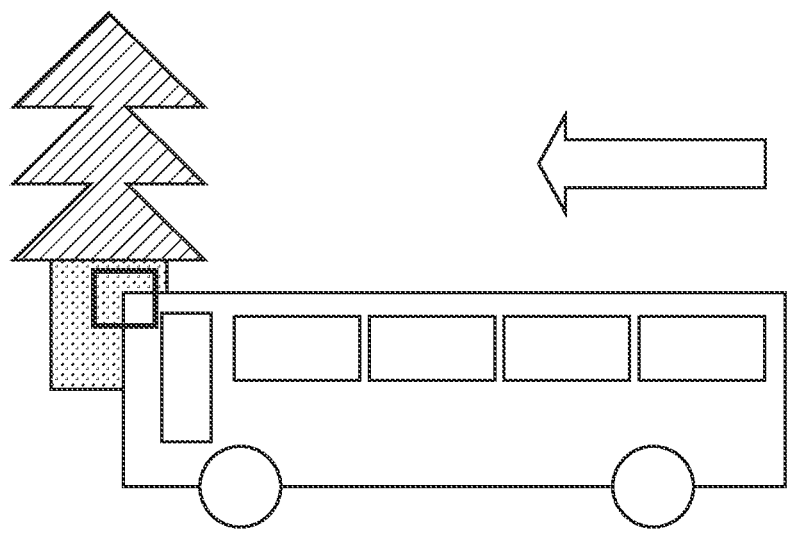
FIGS. 6A and 6B are views for explaining the effect of the first embodiment.
Figure 6B:
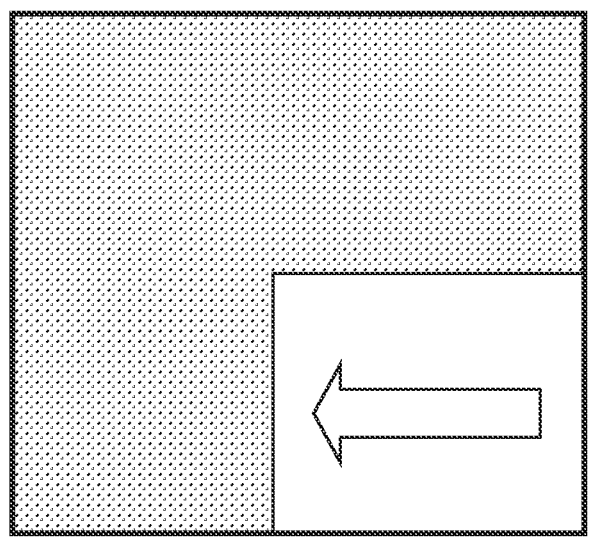

An effect obtained by adding step S3055 and replacing step S2070 by step S3070 will be described next with reference to FIGS. 6A and 6B. FIGS. 6A and 6B are views for explaining the boundaries of objects. FIG. 6A shows a state in which a bus moves from right to left but a tree stays still. If this image is reduced, for example, a thick line rectangle is reduced to one pixel. FIG. 6B is an enlarged view showing this rectangle. This rectangle includes part of the still tree and part of the moving bus. In an optical flow corresponding to an equal-magnification image ($I_1$, $I_2$), a plurality of different motion vectors exist in this rectangle. Therefore, the relationship between one motion vector assigned to a pixel (rectangle) of the reduced image and the motion vector of the equal-magnification image or the level of a higher resolution image is uncertain. The optical flow flow' [lv+1] input in the processing in step S2070 of FIG. 2 is obtained by simply enlarging flow [lv+1] of the level of the reduced image and follows the above problem, and thus the motion vector at the boundary of the moving object is uncertain. In this embodiment, in step S3055, with reference to a plurality of motion vectors corresponding to the adjacent pixels of a pixel of interest, the SAD between the pixel value of the pixel of interest and the pixel value of a pixel at a position indicated by each motion vector is calculated, and the motion vector having the small SAD is selected. In the example shown in FIGS. 6A and 6B, not a motion vector which is uncertain in the boundary region but a motion vector included in a region of the adjacent tree or bus is selected. It is an important point that the images $I_1$ [lv] and $I_2$ [lv] at the level lv of a resolution higher than that of the level (lv+1) at which flow [lv+1] is calculated are used to calculate the SAD. Since the resolution is high, the correctness of the motion vector in the boundary region is improved. Furthermore, as the above-described arrangement pattern, candidate positions are not simply arranged near the pixel of interest but roughly arranged sufficiently far from the pixel of interest. This indicates a state in which the enlargement processing of the optical flow applies a kind of low-pass filter to the optical flow, thereby decreasing the correctness of the motion vector not only at the boundary but also around the boundary. In this embodiment, since the optical flow is enlarged twice using the bilinear method of performing enlargement with reference to four adjacent points, the motion vector in the enlarged optical flow is influenced by the motion vectors of pixels within a two-pixel radius. Therefore, the candidate positions set in the arrangement pattern shown in FIG. 4 are separated from each other by three or more pixels. If the bicubic method with a large number of taps or enlargement to twice or more is applied in the enlargement processing, the respective candidate positions are desirably arranged more roughly than the arrangement pattern shown in FIG. 4.

In this embodiment, the LK method is applied in step S2070. The present invention, however, is not limited to this. Another gradient method such as an HK method or another motion detection method such as template matching can be used.

First Modification

In the first embodiment, the pixel positions dealt by the function given by equation (12) are limited to integers to reduce the interpolation calculation amount. However, if it is unnecessary to reduce the calculation amount, the pixel positions having real numbers may be processed intact, and the SAD may be calculated using interpolated pixel values. In the first embodiment, to extract corresponding points having higher likelihood of correspondence, the SAD is obtained as a difference. However, the present invention is not limited to the SAD, and an SSD (Sum of Squared Difference) or a weighted SAD or SSD may be used. Furthermore, the feature amount of a pixel such as a SIFT feature amount is represented by a multidimensional vector, and its norm may be used as an index. In this case as well, as the norm is smaller, the likelihood of correspondence is higher.

Second Modification

In the first embodiment, a motion vector corresponding to the smallest one of the 13 SADs is used to determine flow"[lv+1](C). However, the average of the motion vectors corresponding to the smallest and second smallest ones of the 13 SADs may be used as flow"[lv+1](C). In this case, flow"[lv+1](C) can be obtained by equations (17) to (19).

$$j0 = \arg\min_i (sad(I_1[lv], C, I_2[lv], C + \text{round}(\text{flow'}[lv+1](C+Y_i)))) \quad (17)$$

$$j1 = \arg\min_i (sad(I_1[lv], C, I_2[lv], C + \text{round}(\text{flow'}[lv+1](C+Y_i)))) \quad (18)$$

$$\text{flow"}[lv+1](C) = (\text{flow'}[lv+1](C+Y_{j0}) + \text{flow'}[lv+1](C+Y_{j1}))/2 \quad (19)$$

Note that the average of the motion vectors corresponding to the SADs from the smallest SAD to the pth (p is an integer of 3 (inclusive) to 13 (exclusive)) SAD among the 13 SADs may be used as flow"[lv+1](C).

Third Modification

In the first embodiment, in step S2040, the optical flow flow [lv+1] is enlarged to generate flow' [lv+1]. That is, the optical flow is enlarged on a frame basis. However, even in an arrangement in which the pixel value of each pixel is calculated with reference to flow' [lv+1], it is possible to obtain the same result.

Fourth Modification

The first embodiment has explained a case in which the first and second images as successive images sensed by a single camera are input to calculate an optical flow. However, stereo images (an image of one viewpoint is the first image and an image of the other viewpoint is the second image) may be input. The motion of the successive images corresponds to a parallax (binocular parallax) for the stereo images. Therefore, it is possible to generate a parallax map from the stereo images by the same procedure.

Fifth Modification

In the first embodiment, reduced images corresponding to the level lv of the first and second images are generated every time the loop of steps S2020 to S2090 is executed. However, (max_lv) reduced images obtained by recursively reducing the first image at the reduction ratio sf and (max_lv) reduced images obtained by recursively reducing the second image at the reduction ratio sf may be generated at once. In this case, the processing in step S2030 is performed before step S2020. In step S2050, among the (max_lv) reduced images obtained by recursively reducing the first image at the reduction ratio sf and the (max_lv) reduced images obtained by recursively reducing the second image at the reduction ratio sf, reduced images corresponding to the level lv are acquired. The reduction ratio may be changed for each level.

Second Embodiment

In the following embodiments including this embodiment, the difference from the first embodiment will mainly be described, and the rest is assumed to be the same as in the first embodiment, unless otherwise specified. In this embodiment, an optical flow is calculated in consideration of occlusion between objects.

Figure 7:
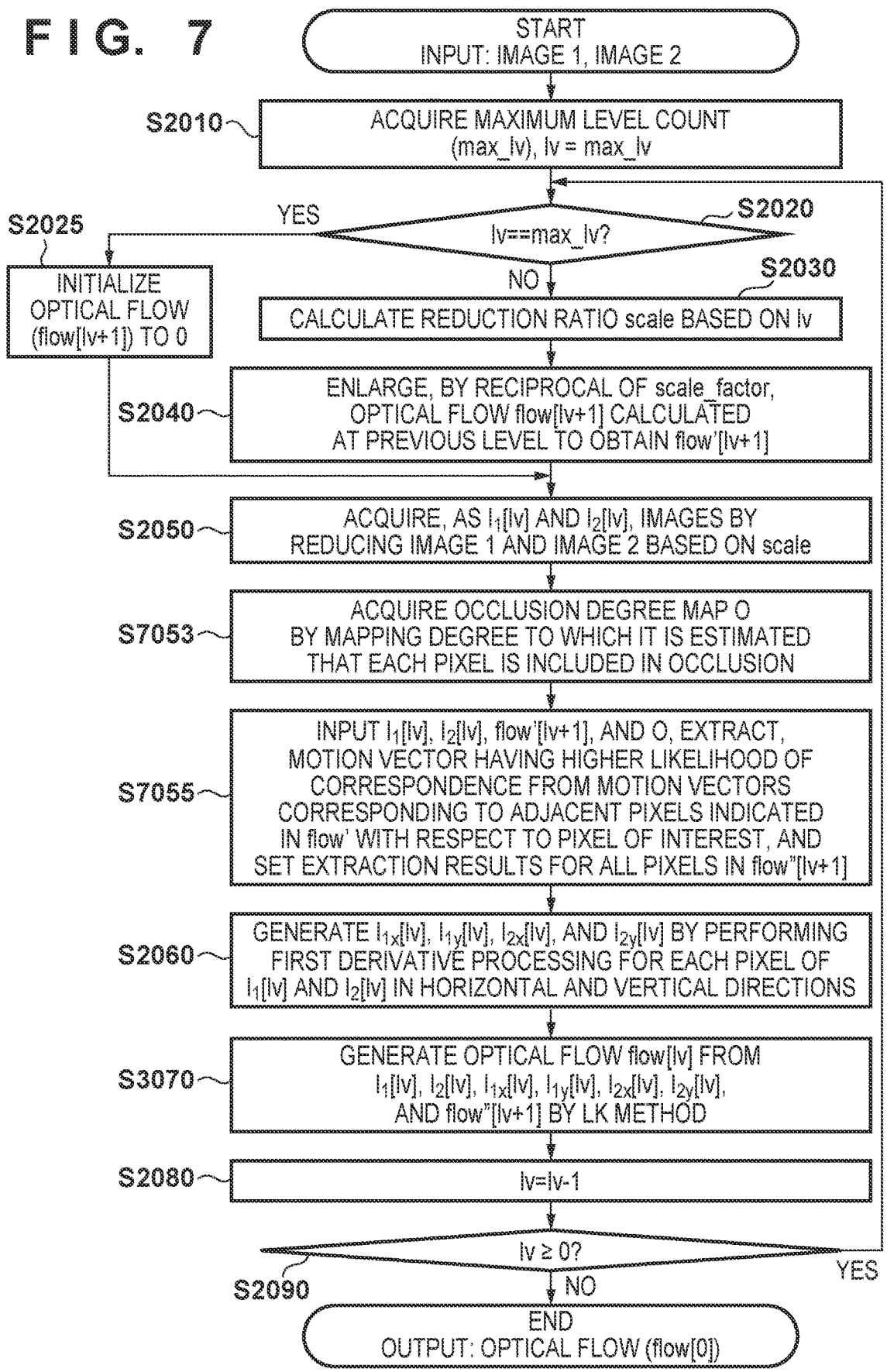
FIG. 7 is a flowchart illustrating optical flow calculation processing according to the second embodiment.

Optical flow calculation processing according to this embodiment will be described with reference to a flowchart shown in FIG. 7. In the flowchart shown in FIG. 7, the same step numbers as in FIGS. 2 and 3 denote the same processing steps and a description thereof will be omitted. In FIG. 7, processes in steps S7053 and S7055 are performed instead of the processing in step S3055 of the flowchart shown in FIG. 3.

In step S7035, a CPU 102 acquires an occlusion degree map O as a map in which, for each pixel in $I_2$ [lv], "a degree (occlusion degree) to which it is estimated that the pixel is included in occlusion" is registered. That is, the occlusion degree map O is two-dimensional data having the same resolution as that of the first and second images. In the occlusion degree map O, a value O (C) at a coordinate position C of interest can be obtained by, for example, the following method.

First, gx(C) is generated by applying a Laplacian filter to the x component (flow'$_x$ [lv+1](C)) of flow' [lv+1](C), given by:

$$g_x(C) = K_L * flow'_x[lv+1](C) \quad (20)$$

where $K_L$ represents the kernel of a 7×7 DoG filter.

Similarly, gy(C) is generated by applying the Laplacian filter to the y component (flow'$_y$ [lv+1](C)) of flow' [lv+1](C), given by:

$$g_y(C) = K_L * flow'_y[lv+1](C) \quad (21)$$

The value of the root sum square of gx(C) obtained by equation (20) and gy(C) obtained by equation (21) is obtained as a value (occlusion degree O (C)) at the coordinate position C of interest in the occlusion degree map O, given by:

$$O(C) = \sqrt{g_x(C)^2 + g_y(C)^2} \quad (22)$$

It is possible to generate the occlusion degree map O by performing the above processing according to equations (20) to (22) for all the coordinate positions C of interest on flow' [lv+1]. The processing of equations (20) to (22) corresponds to calculation of an edge amount when the optical flow is considered as an image.

An occlusion region is generated at the boundary between objects having different motions. That is, an occlusion region is generated in an edge portion when the optical flow is considered as an image. In this embodiment, in consideration of this phenomenon, an occlusion degree map is generated by assuming that the occlusion degree is larger as the degree of the edge of the optical flow is larger. Therefore, a 7×7 Laplacian filter having an edge detection effect is applied. However, the kernel size of the filter is not limited to a specific size. If an increase in calculation amount is allowed, a filter of a large size may be used. Furthermore, an edge detection algorithm is not limited to the Laplacian filter, and the edge of the optical flow may be detected by DoG (Difference of Gaussian) processing. For example, as described in Yuichi Suzuki and Yasushi Yamaguchi, "Motion estimation for video editing", IPSJ SIG Technical Report, Graphics and CAD Technical Report 2009-CG-135(1), 1-6, July 2009, detection of an occlusion region independent of filter processing may be used.

In step S7055, the CPU 102 acquires, as j, i which minimizes an SAD among the values of i from 0 to 12 using equation (23) below instead of equation (14).

$$j = \arg\min_{i} (sad(I_1[lv], C, I_2[lv], C + \text{round}(flow'[lv+1](C+Y_i))) \times \quad (23)$$

$$O(C + \text{round}(flow'[lv+1](C+Y_i))))$$

When comparing equations (14) and (23), a pixel position to be referred to for $I_2$ [lv] is different. According to equation (23), as the occlusion degree indicated by a coordinate as an argument of O in equation (23) is larger, the corresponding pixel position is more difficult to be selected. Note that using equation (24) below instead of equation (23), i which minimizes the SAD among the values of i from 0 to 12 may be acquired as j.

$$j = \arg\min_{i} (sad(I_1[lv], C, I_2[lv], \quad (24)$$

$$C + \text{round}(flow'[lv+1](C+Y_i))) \times O(C+Y_i))$$

If a pixel position (C+Yi) in $I_2$ [lv] is included in occlusion, the correctness of flow' [lv+1](C+Yi) corresponding to the pixel position is assumed to be low. It is thus possible to obtain the same effect in consideration of O (C+Yi).

As described above, by performing processing of acquiring, as j, i which minimizes the SAD among the values of i from 0 to 12 in consideration of the occlusion degree, it is possible to extract a motion vector with higher accuracy than in the first embodiment.

Third Embodiment

FIG. 1B shows an example of the hardware arrangement of an image processing apparatus for executing optical flow calculation processing according to the second embodiment. In FIG. 1B, the same reference numerals as in FIG. 1A denote the same functional units and a description thereof will be omitted.

In the arrangement shown in FIG. 1B, a CPU 102 controls processing according to a flowchart shown in FIG. 7, and respective functional units (to be described below) share and execute processes in steps under the control of the CPU 102.

Processing target images including the first and second images are stored in a memory 103 or a nonvolatile memory 105 by an image input unit 113. An image reduction unit 106 performs reduction processing for the first and second images, that is, processing in step S2050 described above. An optical flow enlargement unit 107 performs conversion processing of the elements and size of an optical flow, that is, processing in step S2040 described above.

An occlusion degree map generation unit 108 performs processing of generating an occlusion degree map O, that is, processing in step S7053 described above. An image filter unit 109 performs first derivative processing for each pixel of an image in the horizontal and vertical directions by performing, for example, Sobel filter processing, that is, processing in step S2060 described above.

A correspondence extraction unit 110 performs processing of controlling an index calculation unit 111 to calculate SADs and calculating flow"[lv+1] using a motion vector corresponding to the smallest one of the calculated SADs, that is, processing in step S7055 described above.

Figure 5:
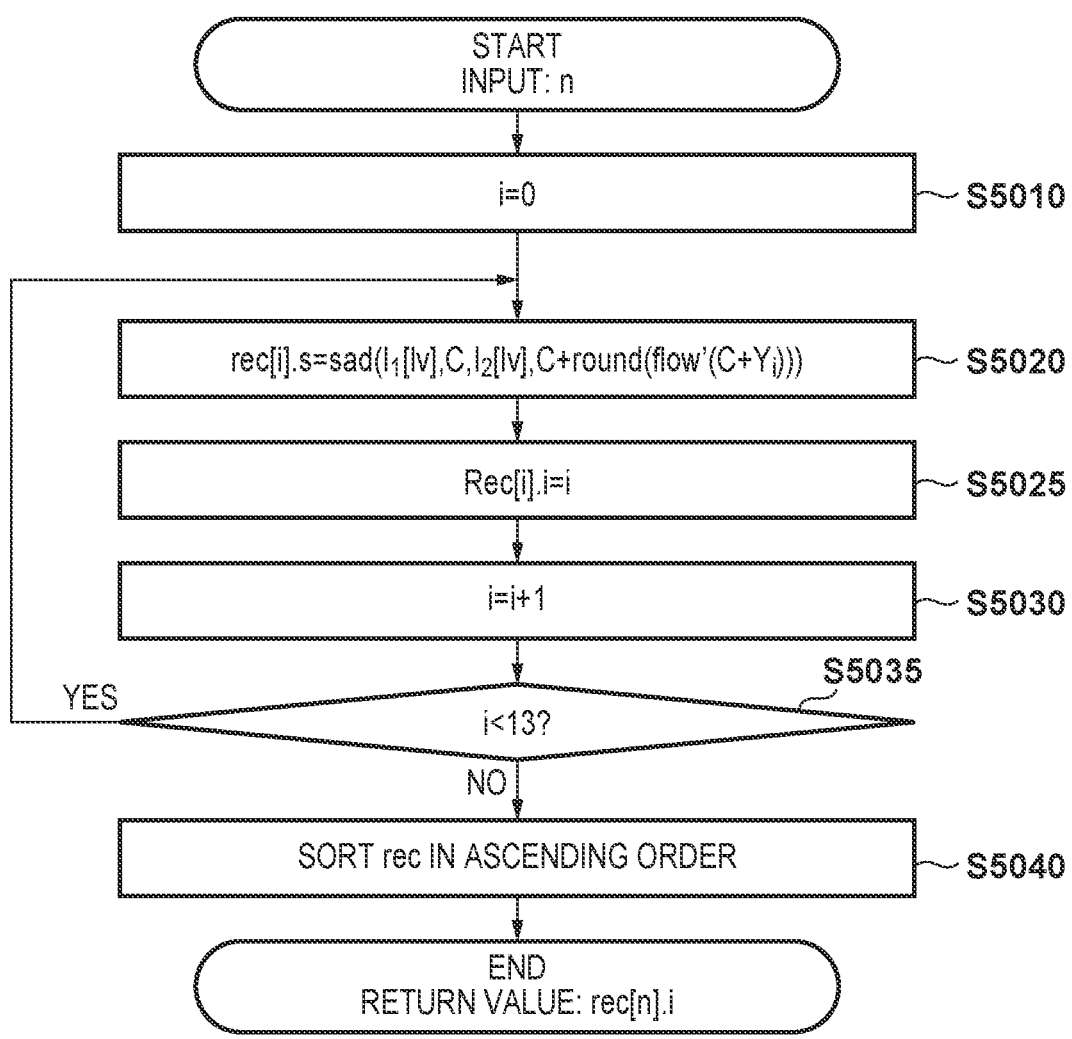
FIG. 5 is a flowchart illustrating processing for obtaining i corresponding to the nth SAD.

The index calculation unit 111 performs processing of calculating the SADs under the control of the correspondence extraction unit 110, that is, processing in step S5020 of FIG. 5 described above. Note that the index calculation unit 111 may calculate the norm of the difference in SSD or SIFT feature amount instead of the SAD.

A correspondence calculation unit 112 performs optical flow calculation processing (step S3070) by the LK method using the reduced images generated by the image reduction unit 106, the optical flow generated by the correspondence extraction unit 110, the image which has been generated by the image filter unit 109 and undergone the filter processing.

In this embodiment, data are exchanged via a bus or memory. The present invention, however, is not limited to this. An arrangement in which data are exchanged by directly connecting the respective processing units may be adopted. In this case, each processing unit includes a line buffer for filter processing or warping processing, and a pipeline for performing processing on a pixel basis is arranged. Alternatively, an arrangement in which each processing unit has a plurality of instances may be adopted.

Referring to FIG. 1B, the functional units except for the CPU 102, the memory 103, the nonvolatile memory 105, and the I/F 190 may be implemented by hardware components or software components (computer programs). In the latter case, the software components are saved in the nonvolatile memory 105. Then, the CPU 102 reads out the software component from the nonvolatile memory 105 into the memory 103 and executes it, thereby implementing the function of the corresponding functional unit.

Furthermore, some or all of the above-described embodiments and modifications may be appropriately combined or selectively used. In summary, a method of calculating an optical flow as a set of motion vectors of the respective pixels using pyramid processing generally inputs an optical flow at a level at which the resolution is low and calculates an optical flow at a level of interest. In the above embodiment, there exists a step of calculating, using image information of a level of a resolution higher than that of a level at which an optical flow is calculated, an index representing the likelihood of correspondence between two pixels indicating motion vectors. A motion vector having the higher likelihood of correspondence is calculated from motion vectors corresponding to the adjacent pixels of the pixel of interest, and used to replace a motion vector in an optical flow at a level of a low resolution. The optical flow in which the motion vector has been replaced is used to calculate an optical flow at the level of interest.

Fourth Embodiment

In this embodiment, an example of an image processing apparatus having the following arrangement will be described. The image processing apparatus acquires the first set including, as elements, the first image and a plurality of reduced images obtained by recursively reducing the first image at a predetermined reduction ratio, and the second set including, as elements, the second image and a plurality of reduced images obtained by recursively reducing the second image at the predetermined reduction ratio. The image processing apparatus selects the images belonging to the second set in ascending order of image size. The image processing apparatus generates a moved selection image by moving each pixel of a currently selected selection image in accordance with a converted optical flow obtained by converting, in accordance with the size of the selection image, an optical flow corresponding to a previously selected image. The image processing apparatus obtains (calculates), as an optical flow corresponding to the selection image, an optical flow which minimizes an evaluation value based on the first difference as the difference between the moved selection image and an image having the same size as that of the selection image among the images belonging to the first set and the second difference as the difference between the converted optical flow and a processed optical flow obtained by performing smoothing processing for the converted optical flow. The image processing apparatus then outputs the optical flow corresponding to the second image, which has been obtained by this calculation processing.

Various definitions used in each of the following embodiments including this embodiment will be described first. An "optical flow" (to be also referred to as an OF hereinafter) in the following description indicates a map image in which a motion vector in a target image with respect to a reference image is registered for each pixel. That is, the optical flow has a resolution (the numbers of pixels in the vertical and horizontal directions) equal to that of the target image. An element of the optical flow corresponding to each pixel of the target image is a two-dimensional vector.

In the following description, if an image is represented by I, a pixel value at a pixel position (x, y) on the image is represented by I(x, y). In the optical flow, an element corresponding to the pixel position (x, y) on the reference image I is represented by (u(x, y), v(x, y)) where u(x, y) represents the horizontal component (X component) of a motion vector corresponding to the pixel position (x, y) on the reference image I and v(x, y) represents the vertical component (Y component) of the motion vector corresponding to the pixel position (x, y) on the reference image I.

Figure 9:
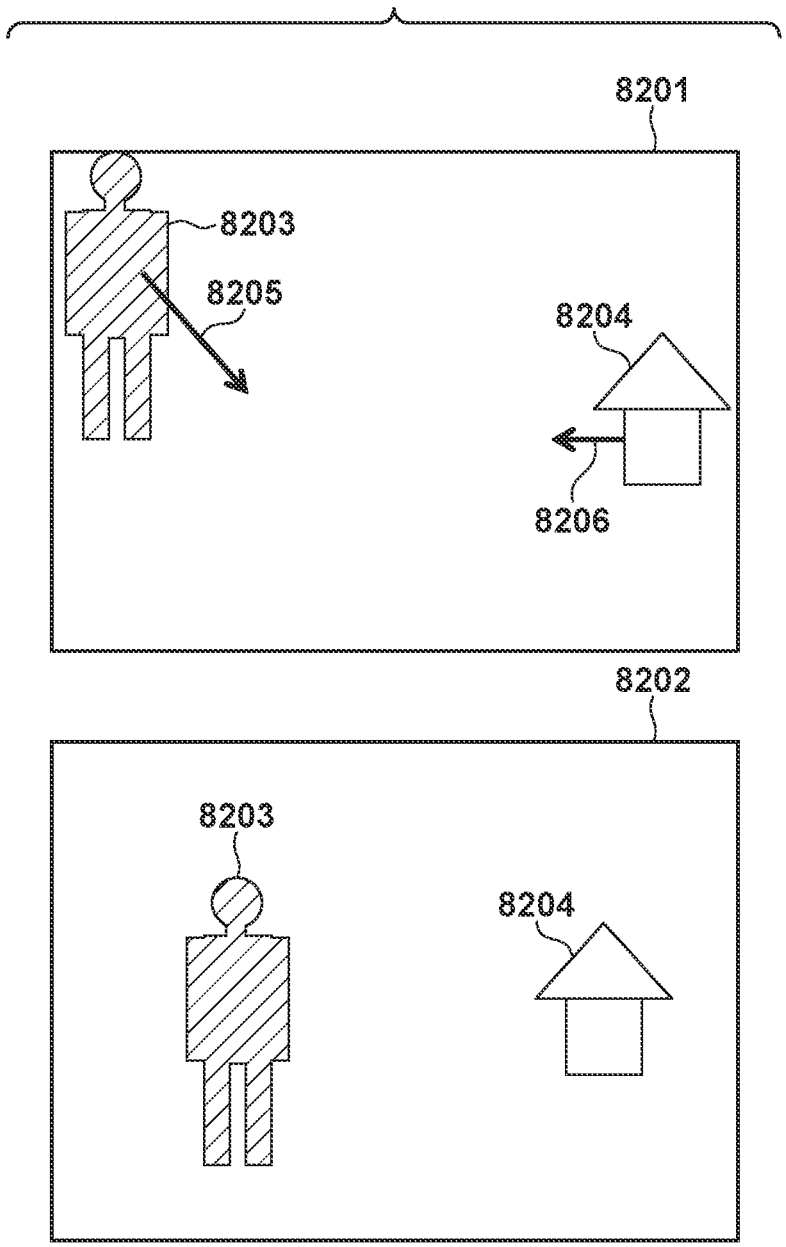
FIG. 9 is a view for explaining an optical flow.

The optical flow will be described by exemplifying FIG. 9. The optical flow of an image 8202 for an image 8201 will be described with reference to FIG. 9. The image 8201 is an image of the Nth (N is an integer of 1 or more) frame in a moving image obtained by sensing a scene in which a person 8203 is moving while moving an image sensing device, and the image 8202 is an image of the (N+N')th (N' is an integer of 1 or more) in the moving image. Each of the images 8201 and 8202 includes the person 8203 and a house 8204 as objects. A motion vector 8205 indicates a motion vector from the person 8203 in the image 8201 to the person 8203 in the image 8202. A motion vector 8206 indicates a motion vector from the house 8204 in the image 8201 to the house 8204 in the image 8202. In general, motion vectors corresponding to pixels constituting a region of the person 8203 (house 8204) in the image are not completely identical to each other. However, in FIG. 9, for the sake of descriptive simplicity, assume that the motion vectors of pixels in each object are all identical to each other. That is, FIG. 9 assume that all the motion vectors of the respective pixels in the region of the person 8203 in the image 8201 are the motion vectors 8205, and all the motion vectors of the respective pixels in the region of the house 8204 in the image 8201 are the vectors 8206. The components of the motion vector 8205 are represented by (10, 5), and the components of the vector

8206 are represented by (−5, 0). At this time, if a pixel position (x, y) on the image 8201 is included in the region of the person 8203, an element (u(x, y), v(x, y))=(10, 5) corresponding to the pixel position (x, y) in the optical flow for the image 8201 is obtained. Furthermore, if the pixel position (x, y) on the image 8201 is included in the region of the house 8204, an element (u(x, y), v(x, y))=(−5, 0) corresponding to the pixel position (x, y) in the optical flow for the image 8201 is obtained. Note that if the pixel position (x, y) on the image 8201 is included in a background region (a region other than the person 8203 and the house 8204), an element (u(x, y), v(x, y))=(0, 0) corresponding to the pixel position (x, y) in the optical flow for the image 8201 is obtained.

In this embodiment, the first and second images sensed by a single image sensing device at different times (the sensing time of the first image is earlier than that of the second image) are acquired to generate the optical flow of the second image for the first image. Note that the first and second images are not limited to images sensed by the single image sensing device at the different times, and may be images sensed by a plurality of image sensing devices at the same time or images sensed by a plurality of image sensing devices at different times.

An example of the functional arrangement of the image processing apparatus and its operation according to this embodiment will be described with reference to FIG. 10 which is a block diagram showing an example of the functional arrangement of the image processing apparatus and FIG. 11 which is a flowchart illustrating processing performed by the image processing apparatus to generate an optical flow. Note that in Figures, OF represents an optical flow. The processing according to the flowchart shown in FIG. 11 is processing for obtaining an optical flow for one image. Therefore, for example, if an optical flow is obtained for each of a plurality of images, the processing according to the flowchart shown in FIG. 11 is performed for each of the plurality of images.

In step S8401, an image data acquisition unit 8301 acquires the first and second images. A case in which only two images are acquired will be described below but a plurality of images or a moving image may be acquired. If three or more images or a moving image is acquired, two target images or frames are selected to perform subsequent processes.

In step S8402, an image reduction unit 8302 generates a plurality of reduced images by recursively reducing a first image $I_1$ at a reduction ratio scale_factor (to be referred to as sf hereinafter: 0<sf<1). Furthermore, the image reduction unit 8302 generates a plurality of reduced images by recursively reducing a second image $I_2$ at the reduction ratio sf. More specifically, the image reduction unit 8302 acquires a maximum level count (max_lv) as the number of reduced images to be generated from $I_1$ or $I_2$. The maximum level count max_lv may be preset in an image processing apparatus 8100 or input by the user. In this embodiment, $I_1$ ($I_2$) is reduced until the size (the vertical and/or horizontal size) of a reduced image obtained by reducing $I_1$ ($I_2$) max_lv times at the reduction ratio sf is 5% or less of the size (the vertical and/or horizontal size) of $I_1$ ($I_2$). In this case, therefore, max_lv=5 is obtained, as given by:

$$\log_{scale\_factor} 0.05 = \log_{0.05} 0.05 \approx 43 \quad (25)$$

In the following description, a reduced image obtained by reducing $I_1$ lv (lv is an integer within a range of 0 to max_lv) times at the reduction ratio sf is represented by $I_1$ [lv]. A reduced image obtained by reducing $I_2$ lv times at the reduction ratio sf is represented by $I_2$ [lv]. That is, $I_1 = I_1$ [0] and $I_2 = I_2$ [0]. A reduction ratio s of $I_1$ [lv] for $I_1$ (the reduction ratio s of $I_2$ [lv] for $I_2$) is given by:

$$s = sf^{lv} \quad (26)$$

That is, $I_1$ [lv] is obtained by reducing $I_1$ at the reduction ratio s, and $I_2$ [lv] is obtained by reducing $I_2$ at the reduction ratio s. As an example, sf=0.5 is set. However, the value of sf may be arbitrary as long as the value falls within a range of 0 (exclusive) to 1 (exclusive). Note that the size of $I_1$ [max_lv] ($I_2$ [max_lv]) should be set smaller as the motion of a motion detection target between images is larger. However, the size is desirably, appropriately set in accordance with various factors such as a processing time. At the time of image reduction processing, a bicubic method may be used or a method such as a Lanczos 3-lobed method may be used.

In step S8403, a control unit 8399 sets max_lv in the value of a variable lv. In the following description, $I_1$ [lv] and $I_2$ [lv] may be referred to as images at the level lv, $I_1$ [0] and $I_2$ [0] may be referred to as images at the lowest level, and $I_1$ [max_lv] and $I_2$ [max_lv] may be referred to as images at the highest level.

In step S8404, the control unit 8399 determines whether lv<max_lv. If it is determined that lv<max_lv, the process advances to step S8405; otherwise, the process advances to step S8408.

In step S8408, an OF initialization unit 8303 initializes the values of all the elements of the optical flow at the level max_lv to 0. In the following description, an optical flow at the level lv is represented by OF [lv]. The resolution of OF [lv] is equal to that of $I_1$ [lv] and $I_2$ [lv]. Then, the process advances to step S8409.

On the other hand, in step S8405, an OF enlargement unit 8307 multiplies the value of each element (the component values of each motion vector) of the optical flow (OF [lv+1]) obtained lately by 1/sf, and then generates OF'[lv+1] by enlarging the vertical/horizontal size of the optical flow by 1/sf times. In the enlargement processing, the X and Y components of the motion vector are individually processed, similarly to enlargement of an RGB image in which R, G, and B components are individually processed. For this enlargement processing, bilinear interpolation may be used or another method such as a bicubic method may be adopted. The relationship between the elements u(x, y) and v(x, y) in OF [lv+1] and elements u' (x, y) and v' (x, y) in OF' [lv+1] is given by:

$$(u'(x, y), v'(x, y)) = \frac{1}{sf}(u(sf \times x, sf \times y), v(sf \times x, sf \times y)) \quad (27)$$

In step S8406, an image deformation unit 8305 selects $I_2$ [lv] from $I_2$ [0] to $I_2$ [max_lv], and generates an image $I_{2w}$ [lv] by moving (warping) pixels in the selected image $I_2$ [lv] in accordance with OF'[lv+1]. That is, the image $I_{2w}$ [lv] is generated by moving, in the direction of a motion vector defined by u' (x, y) and v' (x, y) in OF'[lv+1], a pixel at the pixel position (x, y) in $I_2$ [lv] by the length of the motion vector, given by:

$$I_{2w}[lv](x,y) = I_2[lv](x+u'(x,y), y+v'(x,y)) \quad (28)$$

In step S8407, an OF smoothing unit 8304 applies a smoothing filter to the optical flow OF'[lv+1] generated in step S8405, thereby generating an optical flow OF''[lv+1] having undergone smoothing processing. As the smoothing filter, for example, an averaging filter, a joint bilateral filter, or the like can be used. If a joint bilateral filter is used, it is possible to improve the reproducibility of an object boundary by referring to the pixel values of $I_2$ [lv]. Alternatively, a nonlinear filter such as a median filter may be used. That is, any method capable of smoothing the optical flow OF' [lv+1] may be used. This embodiment assumes that smoothing processing is performed for the optical flow OF'[lv+1] using an averaging filter having a filter size of 7×7.

In step S8409, an energy function generation unit 8306 generates an energy function as a function based on the first difference as the difference between $I_1$ [lv] and $I_{2w}$ [lv] and the second difference as the difference between OF'[lv+1] and OF"[lv+1]. The processing in step S8409 will be described in detail later.

In step S8410, an OF calculation unit 8308 generates an optical flow OF [lv] which minimizes the energy function generated in step S8409. The processing in step S8410 will be described in detail later.

In step S8411, the control unit 8399 determines whether the value of the variable lv is 0. If it is determined that the value of the variable lv is 0, the OF calculation unit 8308 outputs, as the optical flow of the image $I_2$ with reference to the image $I_1$, the optical flow OF [0] generated in step S8410. The output destination of the optical flow OF [0] by the OF calculation unit 8308 is not limited to a specific output destination such as the memory of the image processing apparatus 8100, an external memory, and an external device. The processing according to the flowchart shown in FIG. 11 ends.

On the other hand, if it is determined that the value of the variable lv is not 0, the process advances to step S8412. In step S8412, the control unit 8399 decrements the value of the variable lv by one, and then the process advances to step S8404.

The processing in step S8409 will be described in detail next. A method of estimating an optical flow so as to minimize the energy function is generally called a gradient method. A term called a data term serves as the basis of the method, and the data term is defined by:

$$\rho(x,y)=f(I_1(x,y)-I_{2w}(x,y)) \quad (29)$$

where f represents a function of obtaining the difference between $I_1$ and $I_{2w}$, and may represent a function of obtaining the absolute value of the difference between $I_1$ and $I_{2w}$ or a function of obtaining the square of the difference between $I_1$ and $I_{2w}$. The energy functions of the gradient method can be classified into two types.

The first type defines the sum of data terms within a range of a given patch as an energy function, given by:

$$E(x, y) = \sum_{(p,q) \in B} \rho(p, q) \quad (30)$$

This method will be referred to as a patch-based method hereinafter. The patch-based method calculates, for each pixel, an optical flow which minimizes the energy function.

Note that B represents a patch region having the pixel position (x, y) at the center. If, for example, a 7×7 patch is considered, p takes an integer value within a range of x−3 to x+3, and q takes an integer value within a range of y−3 to y+3. This method has the advantage that if, for example, the square of the difference is adopted as ρ, it is possible to analytically obtain an optical flow which minimizes the energy function. On the other hand, the estimated optical flow often has a value falling outside a correct value range, and it is difficult to perform estimation at high accuracy.

To solve the above problem, the second type adds, as a constraint, a smoothing term for smoothing the optical flow. The energy function is often defined by:

$$E = \sum_{(x,y)} [\lambda \rho(x, y) + g(\nabla u(x, y), \nabla v(x, y))] \quad (31)$$

where λ represents an appropriate weighting factor, and $\nabla u$ and $\nabla v$ represent the gradients of the optical flow. In the patch-based method, Σ takes the sum within the patch region. In this example, however, Σ takes the sum of all the pixels. In addition, g represents the smoothing term, and a TV norm or L2 norm is often used. For example, the gradients are calculated by:

$$\nabla u(x,y)=(u(x+1,y)-u(x,y),u(x,y+1)-u(x,y))$$

$$\nabla v(x,y)=(v(x+1,y)-v(x,y),v(x,y+1)-v(x,y)) \quad (32)$$

In the method using the smoothing term, the optical flows of all the pixels are optimized so as to minimize the energy function of the entire image given by equation (31). This method will be referred to as an energy optimization method hereinafter. The energy optimization method can obtain an accurate optical flow but has a problem that iterative calculation is required for optimization, resulting in an increase in calculation amount.

In consideration of the problems of the patch-based method and energy optimization method, this embodiment estimates an optical flow with almost the same calculation amount as that of the patch-based method while incorporating the concept of the energy optimization method by adding a pseudo smoothing term to the patch-based method. The energy function according to this embodiment is given by:

$$E(x, y) = \sum_{(p,q) \in B} \rho(p, q) + \lambda \varphi(x, y) \quad (33)$$

The energy function given by equation (33) corresponds to the pixel position (x, y). Note that in equation (33), the sum in the patch is not calculated for φ but may be calculated, similarly to ρ( ). In equation (33), ρ( ) and φ( ) are given by:

$$\rho(p,q)=[I_2[lv](p+u'(x,y)+du[lv](x,y),q+v'(x,y)+dv[lv](x,y))-I_1[lv](p,q)]^2$$

$$\varphi(x,y)=[u'(x,y)+du[lv](x,y)-u_{ave}(x,y)]^2+[v'(x,y)+dv[lv](x,y)-v_{ave}(x,y)]^2 \quad (34)$$

where p and q respectively represent an x coordinate value and a y coordinate value in the patch region having the pixel position (x, y) at the center. In step S8410, du [lv] (x, y) and dv [lv] (x, y) which minimize E (x, y) are obtained as the X and Y components of the motion vector for the pixel position (x, y) in the image $I_2$ [lv] in the optical flow corresponding to the image $I_2$ [lv].

ρ (p, q) indicates the square of the difference between the pixel value at a pixel position moved from the pixel position (p, q) in the image $I_{2w}$ [lv] by a motion vector defined by du [lv](x, y) and dv [lv](x, y) and the pixel value at the pixel position (p, q) in the image $I_1$ [lv]. Note that ρ ( ) is not limited to the square of the difference and various equations each representing "the difference between the pixel value at the pixel position moved from the pixel position (p, q) in the image $I_{2w}$[lv] by the motion vector defined by du[lv](x, y) and dv[lv](x, y) and the pixel value at the pixel position (p, q) in the image $I_1$ [lv]", such as the absolute value of the difference, may be applied.

In equations (34), ϕ(x, y) represents the sum of the square of the difference between an X component $u_{ave}$ (x, y) in OP"[lv+1] and a value obtained by adding du [lv] (x, y) to an X component u' (x, y) in OP'[lv+1] and the square of the difference between a Y component $V_{ave}$ (x, y) in OP"[lv+1] and a value obtained by adding dv [lv] (x, y) to a Y component v' (x, y) in OP'[lv+1]. Note that φ ( ) is not limited to the sum of the squares of the differences, and may be, for example, the sum of the absolute value of the former difference and that of the latter difference.

By adding the term of φ( ) to the energy function, a result in which $u_{ave}$ (x, y) and $v_{ave}$ (x, y) are smooth, as compared with the original optical flow, and outliers are suppressed is obtained. Thus, estimated values are calculated so the values of u' and $u_{ave}$ are not deviated from each other, and this term functions as a smoothing term. The same applies to v.

In equation (33), if λ=0, it comes down to a hierarchical Lucas-Kanade method. Assuming that du and dv are small, ρ undergoes Taylor expansion, yielding:

$$\rho(p,q) \sim [I_{2xw}[lv](p,q)du[lv](x,y) + I_{2yw}[lv](p,q)dv[lv](x,y) + I_{2w}[lv](p,q) - I_1[lv](p,q)]^2 \quad (35)$$

Note that $I_{2xw}$ is calculated by applying a primary partial differential image in the x direction of the image $I_{2w}$ instead of $I_2$ in equation (28) and applying $I_{2xw}$ instead of $I_{2w}$ in equation (28). Similarly, $I_{2yw}$ is calculated by applying a primary partial differential image in the y direction of the image $I_{2w}$ instead of $I_2$ in equation (28) and applying $I_{2yw}$ instead of $I_{2w}$ in equation (28). The primary partial differential images of the image I can be obtained by:

$$I_x(x,y) = (I(x+1,y) + I(x-1,y))/2$$

$$I_y(x,y) = (I(x,y+1) - I(x,y-1))/2 \quad (36)$$

Alternatively, the primary partial differential images of the image I may be obtained by applying the horizontal and vertical Sobel filters or the like. Analytic solutions du and dv to be obtained satisfy the following simultaneous equations. Note that equations (38) and (39) are independent of the level, and thus no level is indicated.

$$A \begin{pmatrix} du \\ dv \end{pmatrix} = b \quad (37)$$

$$A = \begin{pmatrix} \lambda + \sum I_{2xw}(p,q)^2 & \sum I_{2xw}(p,q)I_{2yw}(p,q) \\ \sum I_{2xw}(p,q)I_{2yw}(p,q) & \lambda + \sum I_{2yw}(p,q)^2 \end{pmatrix} \quad (38)$$

$$b = \begin{pmatrix} -\sum I_{2xw}(p,q)I_t(p,q) - \lambda\{u(x,y) - u_{ave}(x,y)\} \\ -\sum I_{2yw}(p,q)I_t(p,q) - \lambda\{v(x,y) - v_{ave}(x,y)\} \end{pmatrix}$$

$$I_t(x,y) \equiv I_{2w}(x,y) - I_1(x,y) \quad (39)$$

By multiplying the two sides of equation (37) by the inverse matrix of A, du and dv can be obtained. As described above, according to this embodiment, it is possible to improve the accuracy without increasing the calculation amount by minimizing the energy so that the difference between a result of smoothing the optical flow at the previous level and the optical flow to be calculated is small.

Fifth Embodiment

The difference from the fourth embodiment will mainly be described below, and the rest is assumed to be the same as in the fourth embodiment, unless otherwise specified. In the fourth embodiment, the optical flow at the level (lv+1) one higher than the current level lv is used for the energy function. To the contrary, in this embodiment, an optical flow obtained for an image of a frame immediately preceding the current frame is used for an energy function. An example in which an optical flow for an image $I_2$ of the current frame is obtained using an optical flow obtained for an image $I_1$ of a frame immediately preceding the current frame will be described below.

An example of the functional arrangement of an image processing apparatus according to this embodiment and processing executed by an image processing apparatus 8100 to obtain an optical flow for the image $I_2$ will be described with reference to a block diagram shown in FIG. 12 and a flowchart shown in FIG. 13. Note that in FIG. 12, the same reference numerals as in FIG. 10 denote the same functional units and a description thereof will be omitted. Furthermore, in the flowchart shown in FIG. 13, the same step numbers as in FIG. 11 denote the same processing steps and a description thereof will be omitted. Note that processing according to the flowchart shown in FIG. 13 is processing for obtaining an optical flow for one image. Therefore, for example, if an optical flow is obtained for each of a plurality of images, the processing according to the flowchart shown in FIG. 13 is performed for each of the plurality of images.

In step S8601, an OF deformation unit 8501 converts an optical flow obtained in the past for the image $I_1$ into a reference optical flow to be used for an energy function for generating the optical flow of the image $I_2$. As the conversion method, various methods are plausible.

For example, the optical flow obtained for the image $I_1$ is the optical flow of the image $I_1$ for an image $I_0$ of a frame immediately preceding the frame of the image $I_1$, and an element of the optical flow represents a motion vector from the image I. If the time interval between the frames is sufficiently short, the motion of an object in the images can be considered as a linear uniform motion, and thus an optical flow obtained by moving each element of the optical flow obtained for the image $I_1$ in accordance with the motion vector indicated by the element of the optical flow can be used as the reference optical flow. With this movement operation, the reference optical flow may include an element for which no motion vector is stored, such element is filled based on the adjacent motion vectors by filter processing or the like.

Note that if the optical flow of the image $I_0$ with reference to the image $I_1$ is obtained, an optical flow obtained by inverting the signs of the elements of the optical flow may be used as the reference optical flow.

Figure 14:
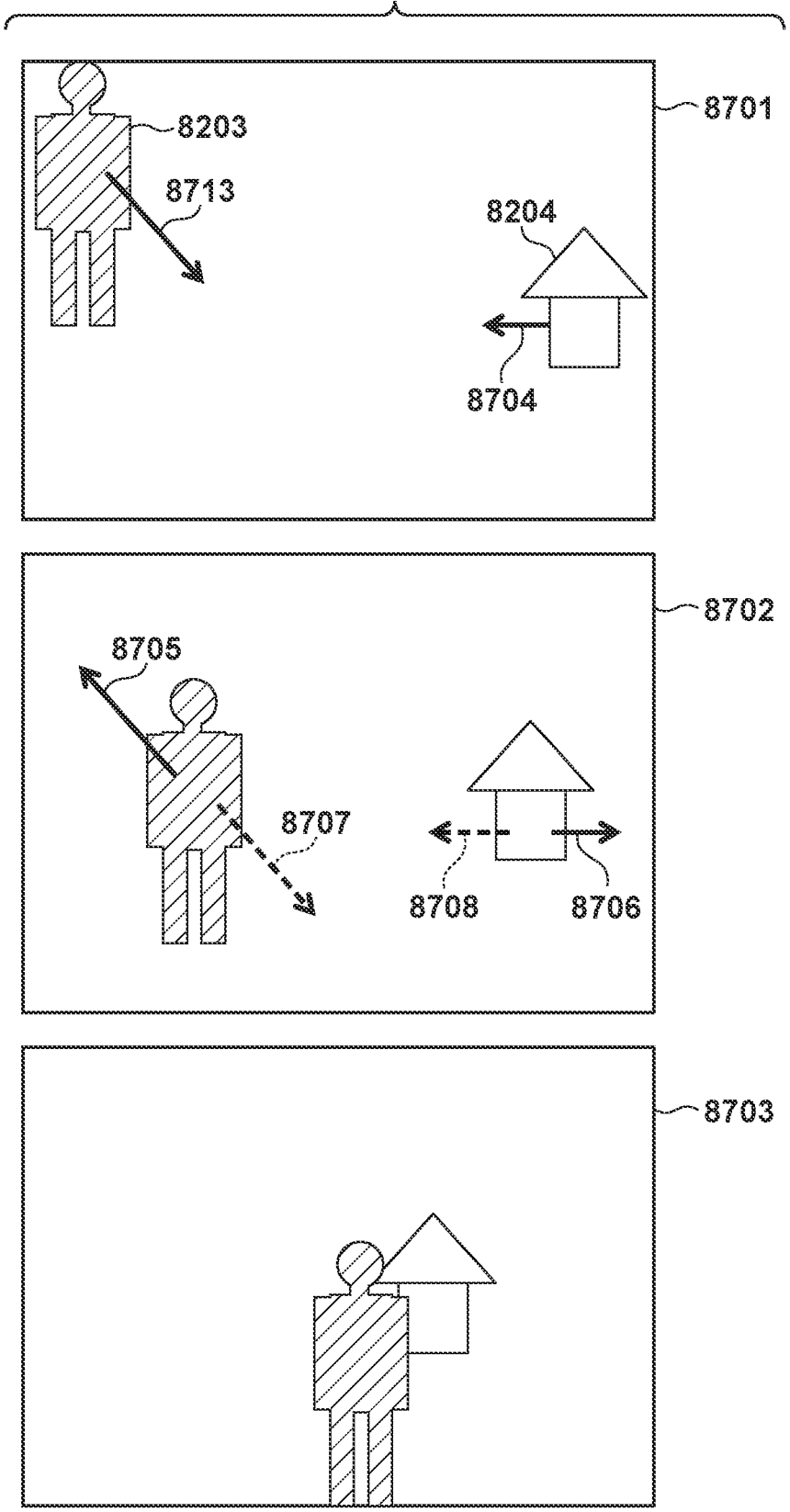
FIG. 14 is a view for explaining processing for obtaining a reference optical flow.

The processing for obtaining the reference optical flow will be described by exemplifying FIG. 14. Images 8701 to 8703 correspond to the images $I_0$ to $I_2$, and each of the images includes a person 8203 and a house 8204.

As a motion vector 8707 of the person 8203 in the image $I_2$ with reference to the image $I_1$, a motion vector is obtained by moving a motion vector 8713 of the person 8203 in the image $I_1$ with reference to the image $I_0$ by the motion vector 8713. If a motion vector 8705 of the person 8203 in the image $I_0$ with reference to the image $I_1$ is obtained, a motion vector obtained by inverting the motion vector 8705 may be set as the motion vector 8707. As a motion vector 8708 of the house 8204 in the image $I_2$ with reference to the image $I_1$, a motion vector is obtained by moving a motion vector 8704 of the house 8204 in the image $I_1$ with reference to the image $I_0$ by the motion vector 8704. If a motion vector 8706 of the house 8204 in the image $I_0$ with reference to the image $I_1$ is obtained, a motion vector obtained by inverting the motion vector 8706 may be set as the motion vector 8708. The thus obtained motion vectors 8707 and 8708 constitute the above reference optical flow.

Referring back to FIG. 13, in step S8602, an OF smoothing unit 8304 performs, for the reference optical flow generated in step S8601, smoothing processing for the optical flow described in the fourth embodiment.

In step S8603, an OF reduction unit 8502 multiplies, by $\mathrm{sf}^{iv}$, the value of each element of the reference optical flow having undergone the smoothing processing in step S8602, and then generates an optical flow by reducing the vertical/horizontal size of the reference optical flow by $\mathrm{sf}^{iv}$ times.

Subsequent processes other than processing of constituting an energy function using, as $u_{ave}(x, y)$ and $v_{ave}(x, y)$, $u(x, y)$ and $v(x, y)$ of the optical flow generated in step S8603 are the same as in the fourth embodiment. Note that in the flowchart shown in FIG. 13, the energy function is constituted using, as $u_{ave}(x, y)$ and $v_{ave}(x, y)$, $u(x, y)$ and $v(x, y)$ of the optical flow generated in step S8603. However, the energy function may be constituted for a specific level, for example, a level other than the last level, similarly to the fourth embodiment, and the energy function may be constituted for the last level using, as $u_{ave}(x, y)$ and $v_{ave}(x, y)$, $u(x, y)$ and $v(x, y)$ of the optical flow generated in step S8603.

Note that similarly to the fourth embodiment, a result of smoothing the optical flow of the previous level may be added to the energy function. Assuming that $u(x, y)$ and $v(x, y)$ of the optical flow generated in step S8603 re represented by $u_{ave1}(x, y)$ and $u_{ave1}(x, y)$ and the X and Y components in OP'''[lv+1] are represented by $U_{ave2}(x, y)$ and $u_{ave2}(x, y)$, the energy function is given by:

$$E(x, y) = \sum_{(p,q) \in B} \rho(p, q) + \lambda_1 \varphi_1(x, y) + \lambda_2 \varphi_2(x, y) \quad (40)$$

$$\varphi_1(x, y) = [u'(x, y) + du[lv](x, y) - u_{ave1}(x, y)]^2 + \quad (41)$$
$$[v'(x, y) + dv[lv](x, y) - v_{ave1}(x, y)]^2$$
$$\varphi_2(x, y) = [u'(x, y) + du[lv](x, y) - u_{ave2}(x, y)]^2 +$$
$$[v'(x, y) + dv[lv](x, y) - v_{ave2}(x, y)]^2$$

Note that in equation (40), the sum in the patch is not calculated for $\phi_1(\ )$ and $\phi_2(\ )$ but may be calculated, similarly to $\rho(\ )$. According to this embodiment, it is possible to calculate an optical flow at high accuracy while suppressing the calculation amount in consideration of the temporal continuity of the optical flow. Note that all the steps shown in FIG. 11 or 13 need not be sequentially executed from above in the above-described order, and the ordinal numbers of some processing steps may be swapped or some processing steps may be parallelly executed.

Sixth Embodiment

The optical flow generated by the optical flow generation processing described in the fourth or fifth embodiment can be applied to various applications. By calculating an optical flow, it is possible to specify a moving object and estimate a direction in which a camera moves. This allows the optical flow to be applied to various applications such as tracking of an object and anti-vibration of a moving image. It is also possible to add a video effect to a sensed image or moving image. For example, it is possible to generate a dynamic image in which a moving object is enhanced, by adding a blur to a sensed image in the direction of an optical flow. Anti-vibration of a moving image and a case in which a blur based on a motion is added to a specific frame will be described below.

An example of the functional arrangement of an image processing apparatus which uses an optical flow for anti-vibration of a moving image will be described with reference to a block diagram shown in FIG. 15. An image processing apparatus 8800 shown in FIG. 15 may be an apparatus included in an image processing apparatus 8100 described above.

An OF data acquisition unit 8801 acquires an optical flow generated and output by the image processing apparatus 8100. An optical flow acquisition method by the OF data acquisition unit 8801 is not limited to a specific acquisition method. For example, the OF data acquisition unit 8801 may acquire an optical flow from the image processing apparatus 8100 via a wireless or wired network or a network obtained by combining wired and wireless networks, or acquire an optical flow stored in an external storage device.

A calculation unit 8802 calculates a global motion using the optical flow acquired by the OF data acquisition unit 8801. The global motion indicates the direction of a most dominant motion for the entire image, and is represented by one vector. The global motion can be calculated by, for example, generating the histogram of optical flow and acquiring a mode. Note that another method may be used to calculate the global motion as long as the motion of the entire image can be calculated.

A smoothing unit 8803 removes high-frequency components in the time direction of the global motion. This is done to remove the vibration of the moving image in the time direction. For example, this can be implemented by performing Fourier transform in the time direction to remove the high frequency or applying a smoothing filter in the time direction.

A anti-vibration unit 8804 performs alignment by electronically shifting, based on the global motion at each time, an image at corresponding time among the images of frames acquired by an image data acquisition unit 8805.

An example of the functional arrangement of an image processing apparatus for adding a blur based on a motion will be described with reference to a block diagram shown in FIG. 16. An image processing apparatus 8900 shown in FIG. 16 may be an apparatus included in the image processing apparatus 8100 described above. In FIG. 16, the same reference numerals as in FIG. 15 denote the same functional units and a description thereof will be omitted. The following description assumes that a processing target image is image 1.

An image deformation unit 8901 generates a shift image by shifting image 1 in accordance with equation (28) using a motion vector obtained by multiplying, by k/n, each element (the components of each motion vector) in the optical flow acquired by the OF data acquisition unit 8801 for k=1 to n−1. For example, when n=10, n−1 shift images are generated for k=1 to 9. An image composition unit 8902 generates a composite image by compositing the n−1 deformed images and image 1 on a pixel basis, and divides the pixel value of each pixel of the composite image by n, thereby generating an image added with a blur. As the motion of an object is larger, the object has a larger optical flow vector. A still object has an optical flow vector of 0.

Therefore, as a motion is larger, an image in which a larger blur occurs is generated. In this embodiment, a fixed value is used as n. However, n may be determined based on the maximum value of the length of the optical flow in the image. For example, if the maximum value of the length of the optical flow is 50 pix, n=50 is set. Furthermore, if the user can designate the strength of a blur, the same processing may be performed by rescaling the optical flow in accordance with the strength. For example, if the effect of a blur is enhanced, processing is performed by multiplying the original optical flow by a certain value. According to this embodiment, the use of an optical flow makes it possible to improve the speed and accuracy of the camera function and add a video effect. In addition, if images sensed by different image sensing devices at the same time are acquired, it is also possible to calculate the depth of an object based on an optical flow.

Seventh Embodiment

Figure 10:
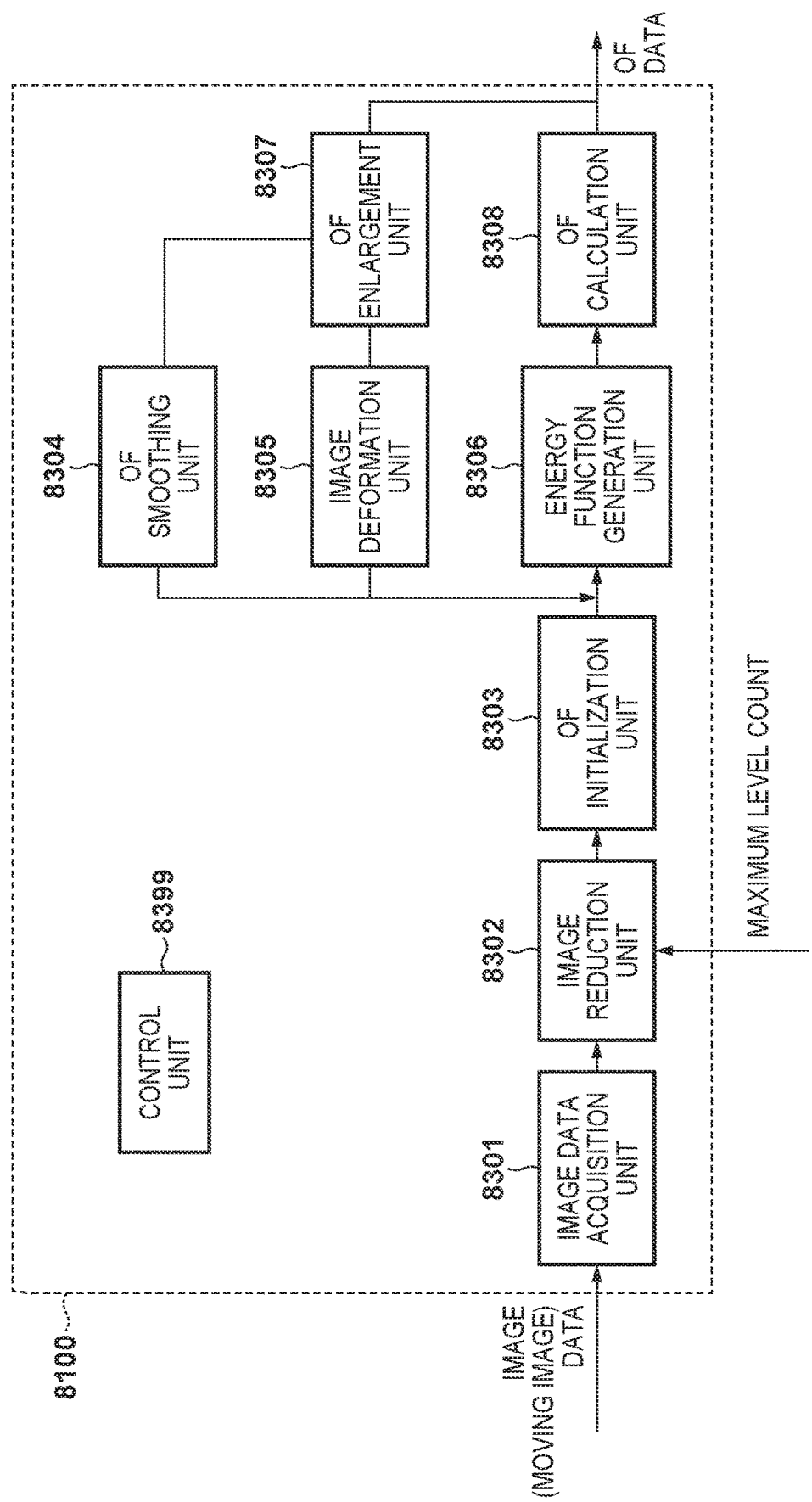
FIG. 10 is a block diagram showing an example of the functional arrangement of an image processing apparatus.
Figure 11:
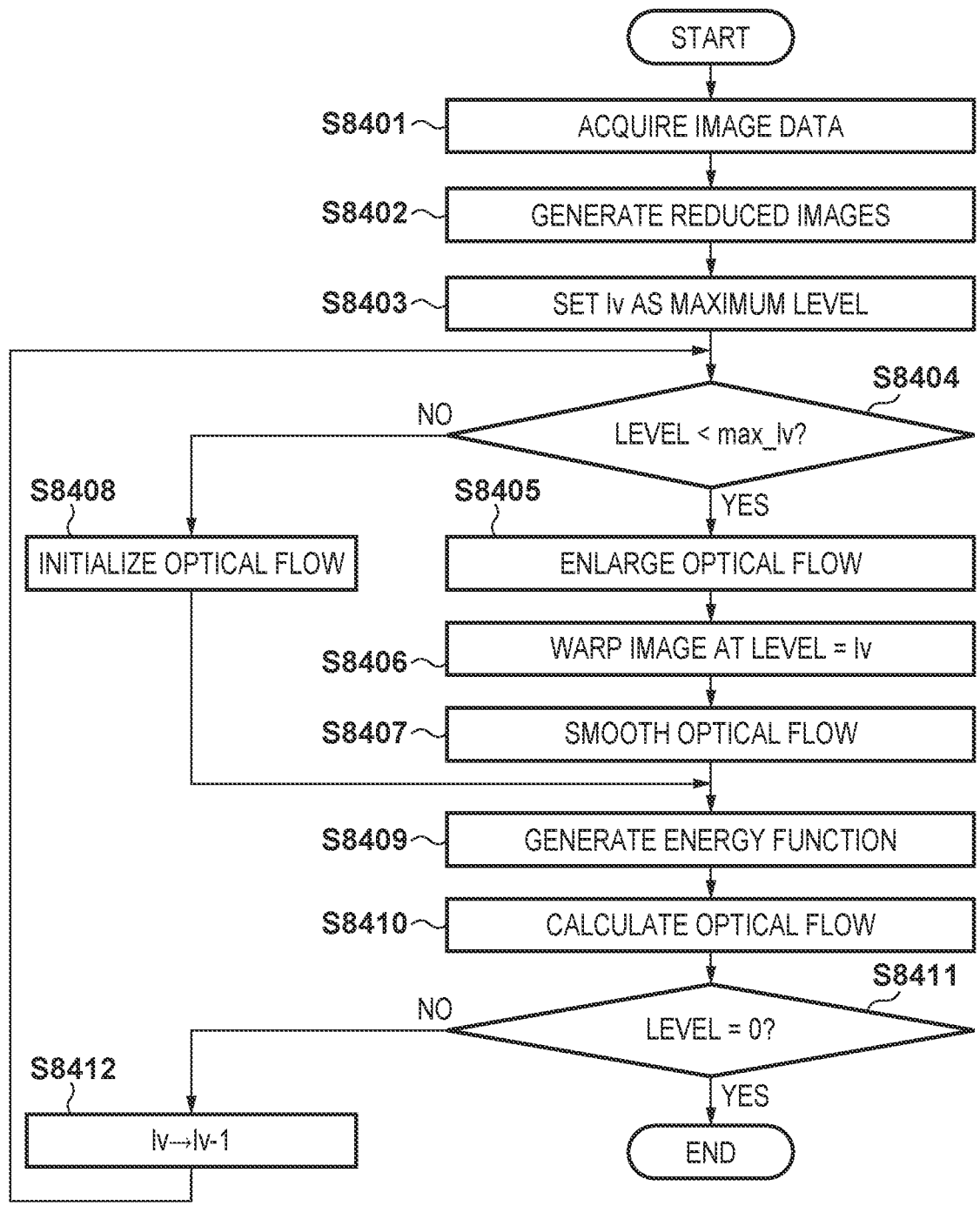
FIG. 11 is a flowchart illustrating processing for generating an optical flow.
Figure 12:
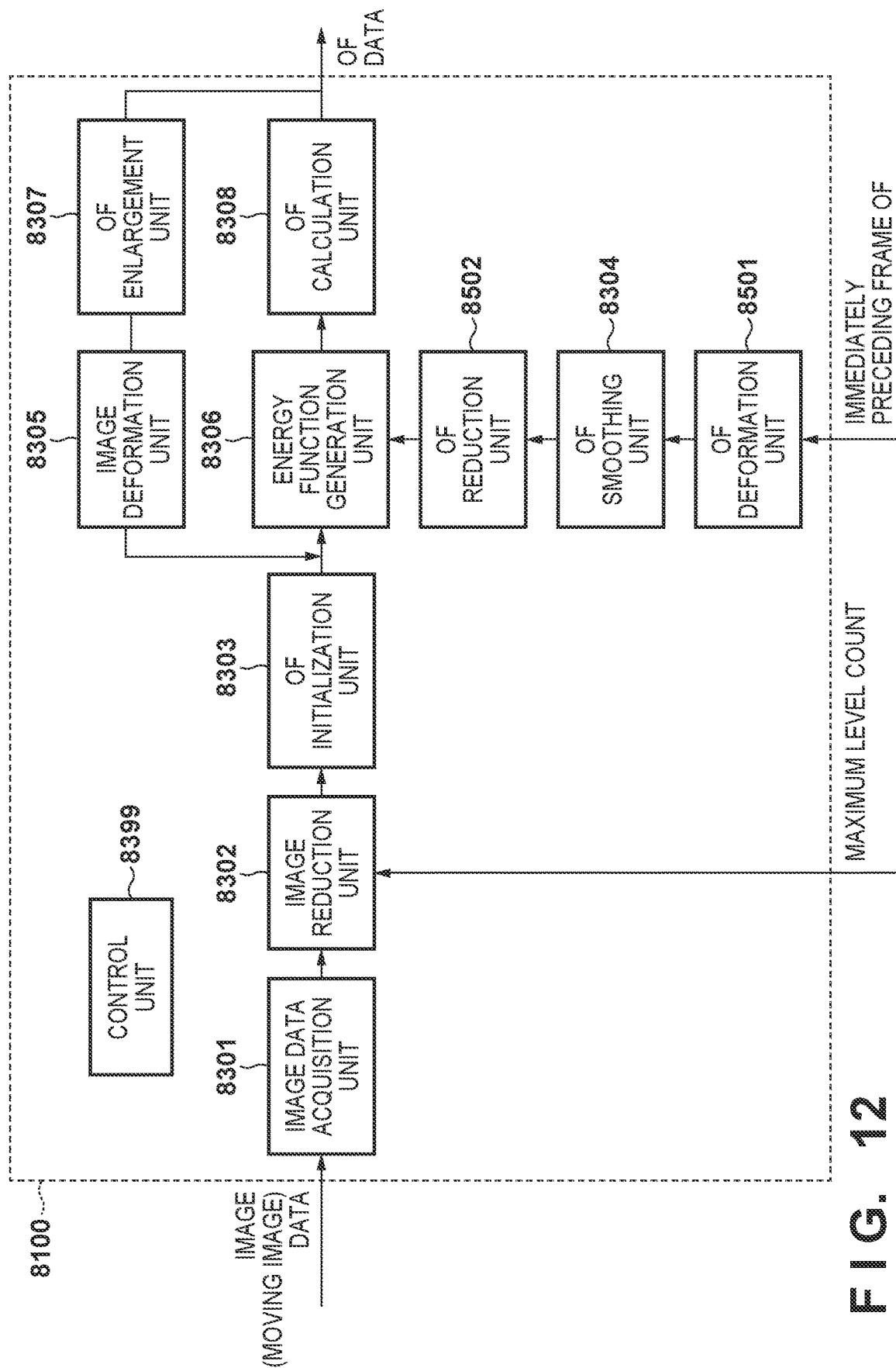
FIG. 12 is a block diagram showing an example of the functional arrangement of an image processing apparatus.
Figure 13:
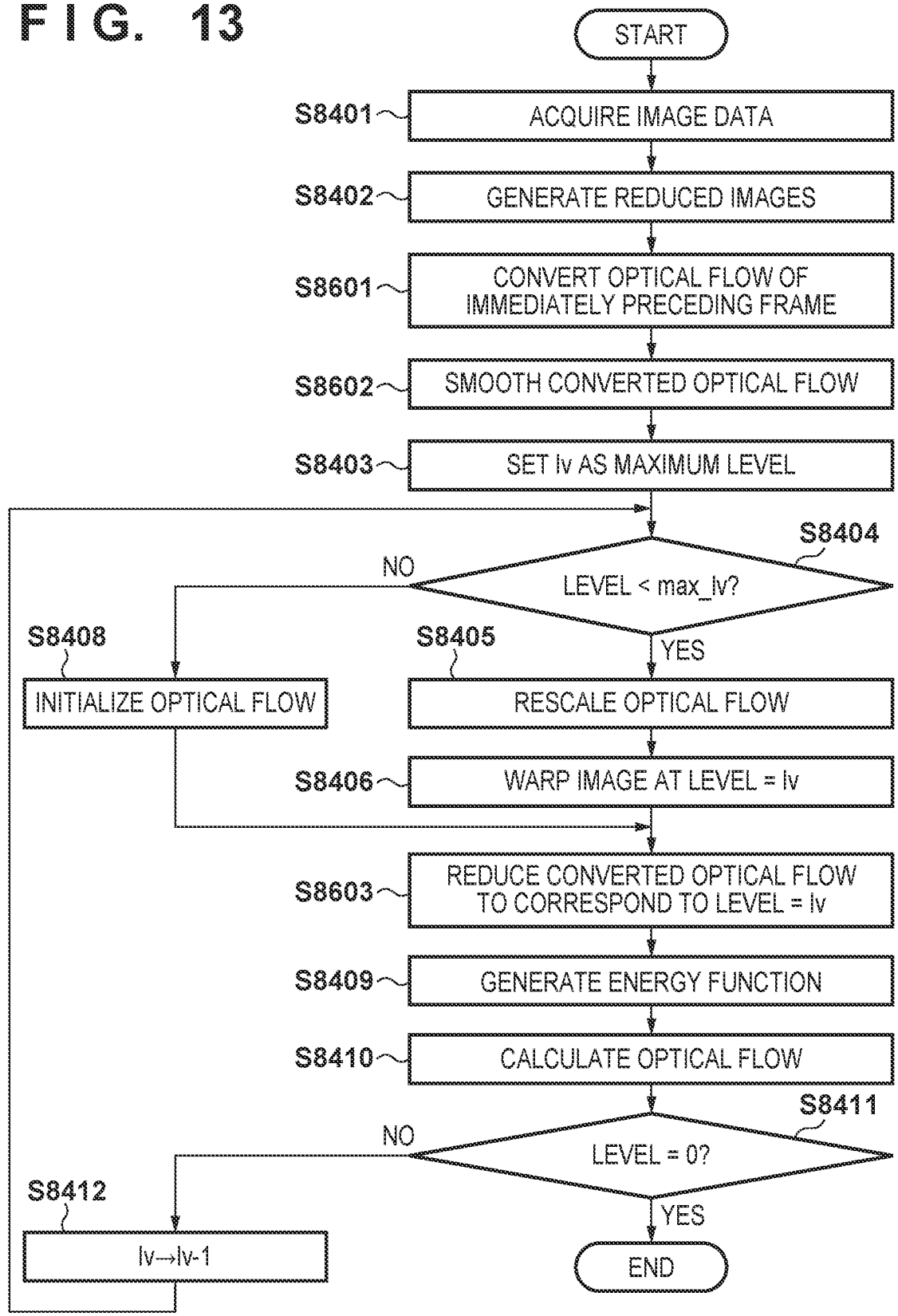
FIG. 13 is a flowchart illustrating processing for generating an optical flow.

Respective functional units forming an image processing apparatus 8100 shown in FIG. 10 or 12 may be implemented by hardware components or software components (computer programs). In the latter case, a computer apparatus including a processor capable of executing the computer programs is applicable to the image processing apparatus 8100. An example of the hardware arrangement of the computer apparatus applicable to the image processing apparatus 8100 will be described with reference to a block diagram shown in FIG. 8.

A CPU 8101 executes various processes using computer programs and data stored in a RAM 8102 and a ROM 8103. This causes the CPU 8101 to control the overall operation of the computer apparatus and also execute or control each process described above as a process to be executed by the image processing apparatus 8100.

The RAM 8102 includes an area to store a computer program and data loaded from the ROM 8103 or a storage unit 8104. The RAM 8102 also includes a work area used by the CPU 8101 to execute various processes. Thus, the RAM 8102 can appropriately provide various areas. The ROM 8103 stores setting data and a boot program which need not be rewritten.

The storage unit 8104 is a mass information storage device represented by a hard disk drive device. An OS (Operating System), and computer programs and data for causing the CPU 8101 to execute each process described above as a process to be executed by the image processing apparatus 8100 are saved in the storage unit 8104. The computer programs saved in the storage unit 8104 include a computer program for causing the CPU 8101 to execute the function of each functional unit shown in FIG. 10 or 12. The data saved in the storage unit 8104 include data explained as known information in the above description, and data of a processing target image or moving image. The computer programs and data saved in the storage unit 8104 are appropriately loaded into the RAM 8102 under the control of the CPU 8101, and processed by the CPU 8101.

Note that a device for reading out information from a storage medium such as a CD-ROM or DVD-ROM, or a memory device such as a flash memory or USB memory is applicable as the storage unit 8104 instead of the hard disk drive device.

A display device 8109 is connected to an output interface 8106. The display device 8109 is formed by a CRT, a liquid crystal screen, a projector device, or the like, and can display or project a processing result by the CPU 8101 with an image and text.

Figure 8:
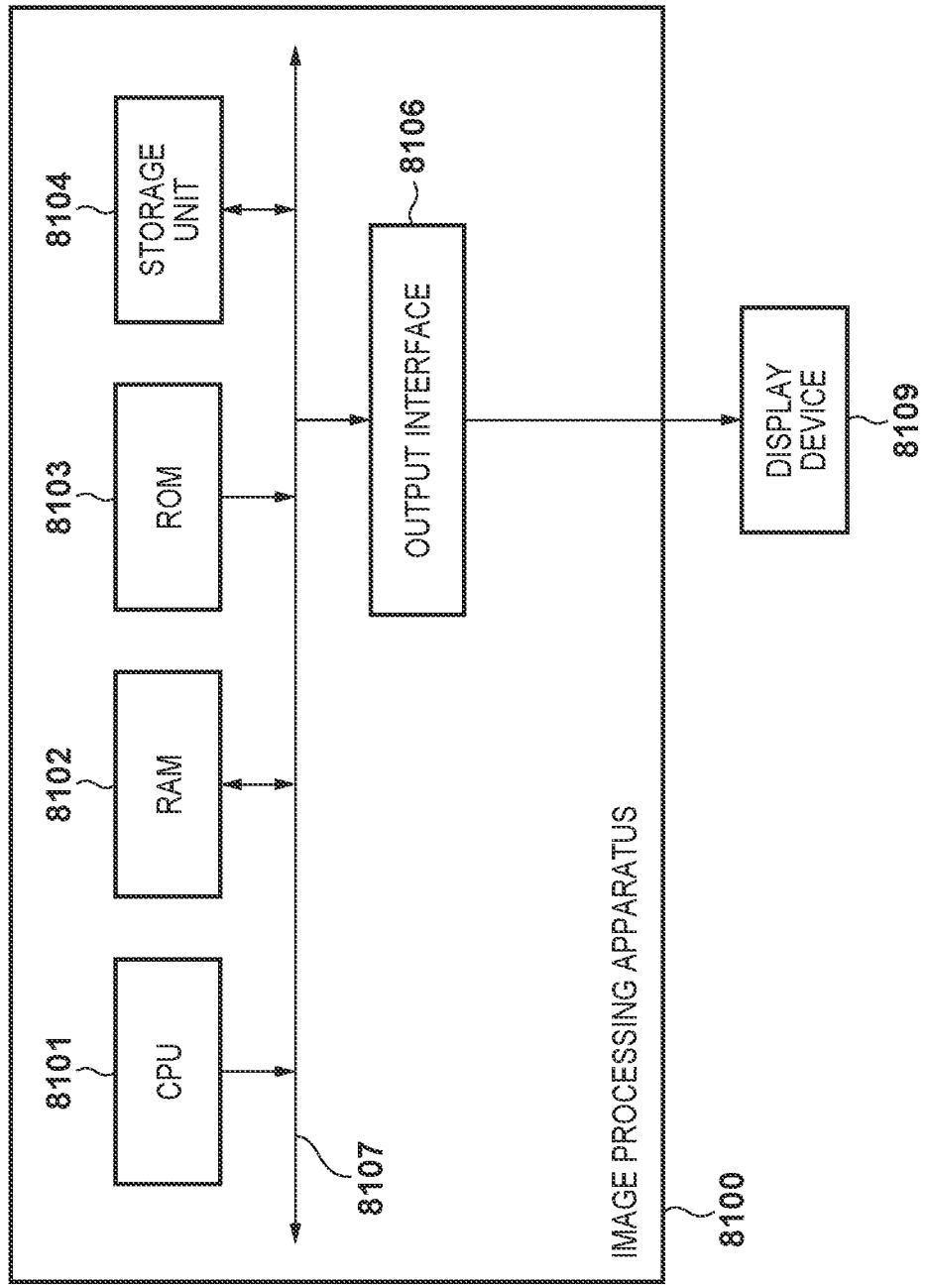
FIG. 8 is a block diagram showing an example of the hardware arrangement of a computer apparatus.

The CPU 8101, the RAM 8102, the ROM 8103, the storage unit 8104, and the output interface 8106 are connected to a bus 8107. Note that the arrangement shown in FIG. 8 is merely an example of the arrangement of the computer apparatus applicable to the image processing apparatus 8100.

Figure 15:
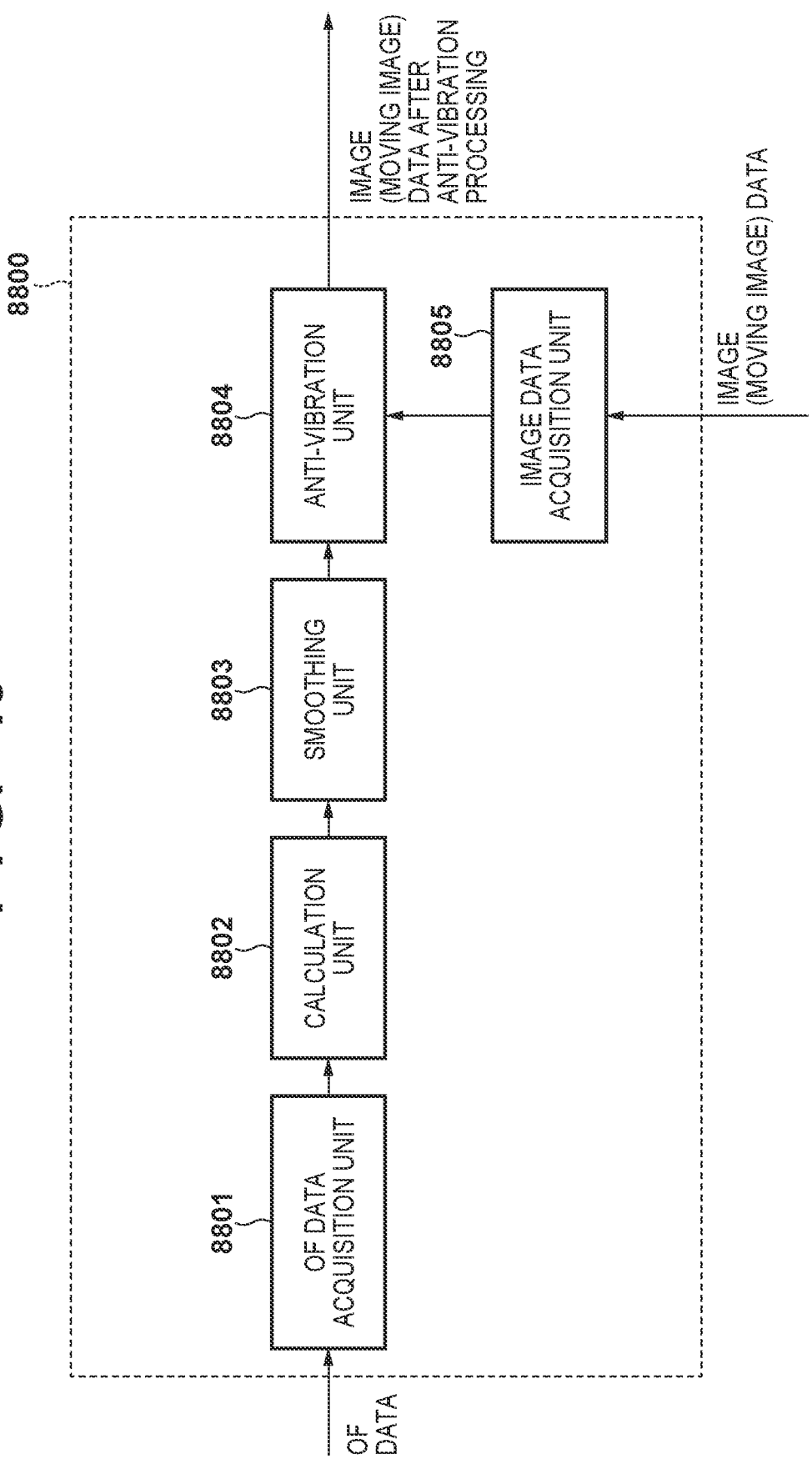
FIG. 15 is a block diagram showing an example of the functional arrangement of an image processing apparatus.
Figure 16:
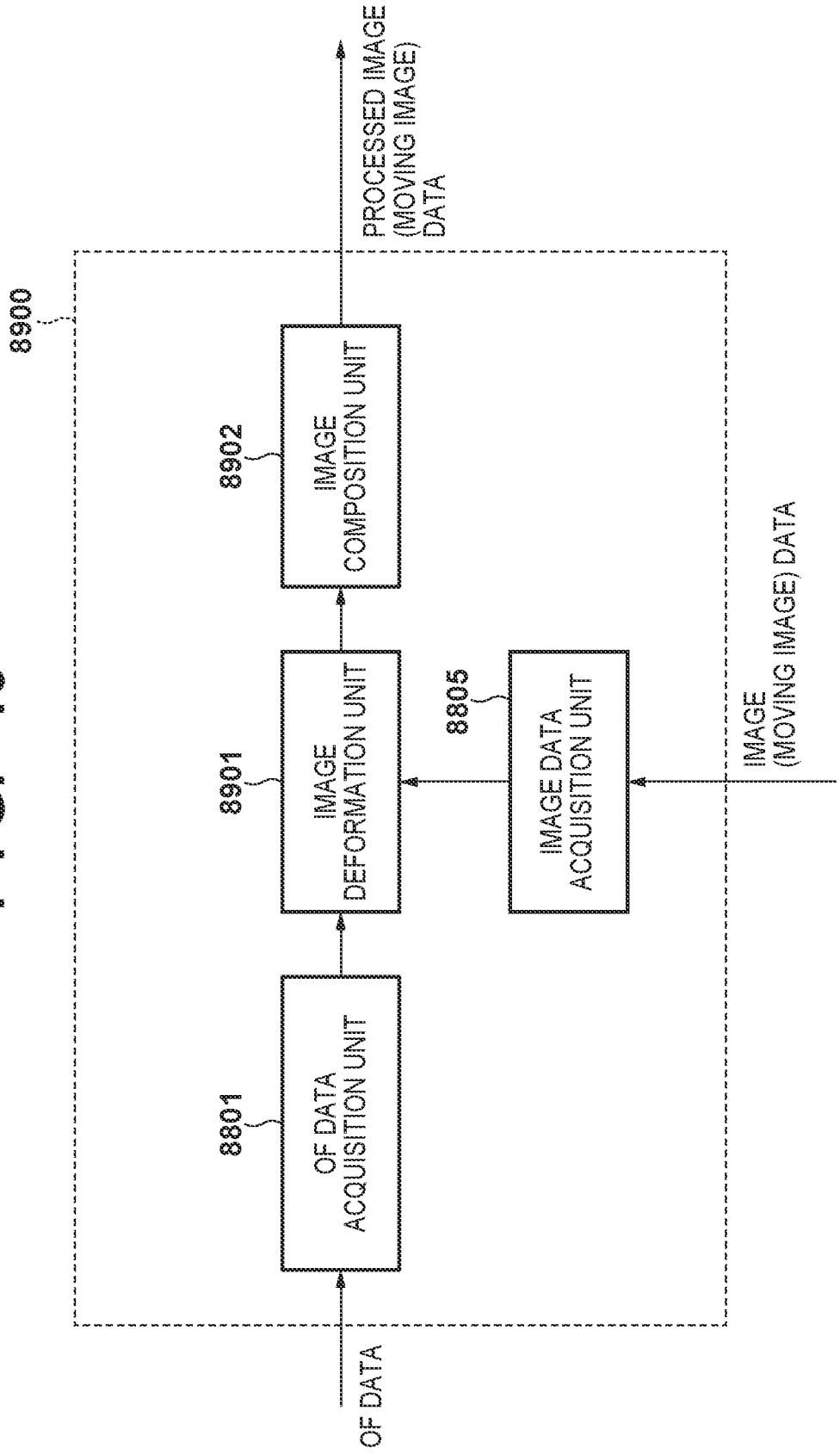
FIG. 16 is a block diagram showing an example of the functional arrangement of an image processing apparatus.

Similarly, the functional units of the image processing apparatus 8800 or 8900 shown in FIG. 15 or 16 may be implemented by hardware components or software components (computer programs). In the latter case, a computer apparatus including a processor capable of executing the computer programs functions as the image processing apparatus 8800 or 8900, and thus the arrangement shown in FIG. 8 is applicable to this computer apparatus, as a matter of course. If the image processing apparatus 8800 or 8900 is included in the image processing apparatus 8100, the computer apparatus shown in FIG. 8 also implements the function of the image processing apparatus 8800 or 8900.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-251918, filed Dec. 26, 2016, and Japanese Patent Application No. 2016-228295, filed Nov. 24, 2016 which are hereby incorporated by reference herein in their entirety.

What is claimed is:

1. An image processing apparatus for, by performing hierarchical processing using a first image group which includes a first image and a plurality of reduced images each obtained by reducing the first image and a second image group which includes a second image and a plurality of reduced images each obtained by reducing the second image, generating an optical flow which indicates motion vectors of pixels between the first image and the second image, the apparatus comprising:
one or more hardware processors; and
one or more memories which store instructions executable by the one or more hardware processors to cause the information processing apparatus to perform at least:
acquiring, as a first acquisition image, an image from the first image group, and acquiring, as a second acquisition image, an image from the second image group, wherein each of the first acquisition image and the second acquisition image has a resolution corresponding to a process target layer;
generating a converted optical flow by converting a resolution of an optical flow which corresponds to a layer of lower resolution than a resolution of the process target layer into the resolution of the process target layer;
generating a new optical flow having the resolution corresponding to the process target layer based on the converted optical flow, the first acquisition image, and the second acquisition image;
generating an optical flow corresponding to the process target layer by using the new optical flow generated from a layer of a low resolution, the first acquisition image, and the second acquisition image; and
outputting an optical flow which indicates motion vectors of pixels between the first image and the second image and is obtained by performing the hierarchical processing in which operations of the acquisition of the first acquisition image and the second acquisition image, the generation of the converted optical flow, the generation of the new optical flow, and the generation of the optical flow are repeated in order from a layer of lower resolution,
wherein, the generation of the new optical flow includes, for each coordinate position of interest in the new optical flow, (i) extracting a motion vector corresponding a pixel at the coordinate position of interest in the converted optical flow and motion vectors corresponding to a plurality of pixels around the pixel at the coordinate position of interest in the converted optical flow, and (ii) specifying, from a motion vector group including the motion vector corresponding the pixel at the coordinate position of interest in the converted optical flow and the motion vectors corresponding to the plurality of pixels around the pixel at the coordinate position of interest in the converted optical flow, one motion vector at the coordinate position of interest in the new optical flow based on differences between pixel values of pixel positions separated, in accordance with each motion vector included in the motion vector group, from the coordinate position of interest in the second acquisition image and a pixel value of a pixel position corresponding to the coordinate position of interest in the first acquisition image.

2. The apparatus according to claim 1, wherein specifying the one motion vector which corresponds to a minimum difference of the differences.

3. The apparatus according to claim 1, wherein specifying a plurality of motion vectors in ascending order of the difference, and specifying, the one motion vector at the coordinate position of interest in the new optical flow, an average of the plurality of motion vectors specified.

4. The apparatus according to claim 1, wherein obtaining an edge amount at each coordinate position in the converted optical flow, and specifying, from the motion vector group, at least one motion vector in ascending order of a product of the difference and the edge amount at a pixel position separated from the coordinate position of interest in accordance with the corresponding motion vector.

5. The apparatus according to claim 1, wherein obtaining an edge amount at each coordinate position in the converted optical flow, and specifying, from the motion vector group, at least one motion vector in ascending order of a product of the difference and the edge amount at the corresponding position.

6. The apparatus according to claim 1, wherein the first image and the second image are images sensed by a plurality of image sensing devices at the same time or at different times.

7. The apparatus according to claim 1, wherein the first image and the second image are images sensed by a single image sensing device at different times.

8. The apparatus according to claim 1, wherein the first image and the second image are an image of one viewpoint and an image of the other viewpoint, which form stereo images.

9. An image processing method for an image processing apparatus for, by performing hierarchical processing using a first image group which includes a first image and a plurality of reduced images each obtained by reducing the first image and a second image group which is include a second image and a plurality of reduced images each obtained by reducing the second image, generating an optical flow which indicates motion vectors of pixels between the first image and the second image, the apparatus, comprising:
acquiring, as a first acquisition image, an image from the first image group, and acquiring, as a second acquisition image, an image from the second image group, wherein each of the first acquisition image and the second acquisition image has a resolution corresponding to a process target layer;
generating a converted optical flow by converting a resolution of an optical flow which corresponds to a layer of lower resolution than a resolution of the process target layer into the resolution of the process target layer;
generating a new optical flow having the resolution corresponding to the process target layer based on the converted optical flow, the first acquisition image, and the second acquisition image;
generating an optical flow corresponding to the process target layer by using the new optical flow generated from a layer of a low resolution, the first acquisition image, and the second acquisition image; and
outputting an optical flow which indicates motion vectors of pixels between the first image and the second image and is obtained by performing the hierarchical processing in which operations of the acquisition of the first acquisition image and the second acquisition image, the generation of the converted optical flow, the generation of the new optical flow, and the generation of the optical flow are repeated in order from a layer of lower resolution in generating the optical flow,
wherein, the generation of the new optical flow includes, for each coordinate position of interest in the new optical flow, (i) extracting a motion vector corresponding a pixel at the coordinate position of interest in the converted optical flow and motion vectors corresponding to a plurality of pixels around the pixel at the coordinate position of interest in the converted optical flow, and (ii) specifying, from a motion vector group including the motion vector corresponding the pixel at the coordinate position of interest in the converted optical flow and the motion vectors corresponding to the plurality of pixels around the pixel at the coordinate position of interest in the converted optical flow, one motion vector at the coordinate position of interest in the new optical flow based on differences between pixel values of pixel positions separated, in accordance with each motion vector included in the motion vector group, from the coordinate position of interest in the second acquisition image and a pixel value of a pixel position corresponding to the coordinate position of interest in the first acquisition image.

10. A non-transitory computer-readable storage medium storing a computer program for causing a computer to execute an image processing method for an image processing apparatus, the method comprising:

acquiring, as a first acquisition image, an image from a first image group, and acquiring, as a second acquisition image, an image from a second image group, wherein each of the first acquisition image and the second acquisition image has a resolution corresponding to a process target layer;

generating a converted optical flow by converting a resolution of an optical flow which corresponds to a layer of lower resolution than a resolution of the process target layer into the resolution of the process target layer;

generating a new optical flow based on the having the resolution corresponding to the process target layer based on the converted optical flow, the first acquisition image, and the second acquisition image;

generating an optical flow corresponding to the process target layer by using the new optical flow generated from a layer of a low resolution, the first acquisition image, and the second acquisition image; and outputting an optical flow which indicates motion vectors of pixels between the first image and the second image and is obtained by performing the hierarchical processing in which operations of the acquisition of the first acquisition image and the second acquisition image, the generation of the converted optical flow, the generation of the new optical flow, and the generation of the optical flow are repeated in order from a layer of lower resolution, wherein, the generation of the new optical flow includes, for each coordinate position of interest in the new optical flow, (i) extracting a motion vector corresponding a pixel at the coordinate position of interest in the converted optical flow and motion vectors corresponding to a plurality of pixels around the pixel at the coordinate position of interest in the converted optical flow, and (ii) specifying, from a motion vector group including the motion vector corresponding the pixel at the coordinate position of interest in the converted optical flow and the motion vectors corresponding to the plurality of pixels around the pixel at the coordinate position of interest in the converted optical flow, one motion vector at the coordinate position of interest in the new optical flow based on differences between pixel values of pixel positions separated, in accordance with each motion vector included in the motion vector group, from the coordinate position of interest in the second acquisition image and a pixel value of a pixel position corresponding to the coordinate position of interest in the first acquisition image.

11. An image processing apparatus for, by performing hierarchical processing using a first image group which includes a first image and a plurality of reduced images each obtained by reducing the first image and a second image group which is include a second image and a plurality of reduced images each obtained by reducing the second image, generating an optical flow which indicates motion vectors of pixels between the first image and the second image, the apparatus comprising:

one or more hardware processors; and one or more memories which store instructions executable by the one or more hardware processors to cause the information processing apparatus to perform at least:

selecting the images, to be processed, belonging to the second image group in ascending order of image size;

generating a converted optical flow obtained by converting, in accordance with a size of a selection image currently selected, an optical flow corresponding to the image previously selected;

generating a moved selection image obtained by moving each pixel of the selection image in accordance with the converted optical flow;

obtaining, as an optical flow corresponding to a resolution of the selection image, an optical flow which minimizes an energy function based on a first difference between pixel values of pixels in the moved selection image and pixel value of pixels in the image having the same size as that of the selection image among the images belonging to the first image group and a second difference between the converted optical flow and a processed optical flow obtained by performing smoothing processing for the converted optical flow; and outputting an optical flow which indicates motion vectors of pixels between the first image and the second image and has been obtained by performing the hierarchical processing in which operations of the selection of the images, the generation of the converted optical flow, the generation of the moved selection image, and the obtainment of the optical flow are repeated in order of lower resolution.

12. The apparatus according to claim 11, wherein the converted optical flow obtained by converting, in accordance with the size of the selection image, the optical flow corresponding to the image previously selected is an optical flow obtained by converting, in accordance with the size of the selection image, a component value of a motion vector as an element of the optical flow corresponding to the image previously selected and a size of the optical flow corresponding to the image previously selected.

13. The apparatus according to claim 11, wherein one of an averaging filter, a joint bilateral filter, and a median filter is used for the smoothing processing.

14. The apparatus according to claim 11, wherein the instruction further causes the apparatus to perform:

obtaining a global motion in an image using the optical flow output, and shifting the image based on the obtained global motion.

15. The apparatus according to claim 11, wherein the instruction further causes the apparatus to perform:

generating a plurality of optical flows from the optical flow output, generating a plurality of shift images by shifting an image using the plurality of optical flows, and compositing the image and the plurality of shift images.

16. The apparatus according to claim 11, wherein the first image and the second image are images sensed by a plurality of image sensing devices at the same time or at different times.

17. The apparatus according to claim 11, wherein the first image and the second image are images sensed by a single image sensing device at different times.

18. An image processing method for an image processing apparatus for, by performing hierarchical processing using a first image group which includes a first image and a plurality of reduced images each obtained by reducing the first image and a second image group which is include a second image and a plurality of reduced images each obtained by reducing the second image, generating an optical flow which indicates motion vectors of pixels between the first image and the second image, the apparatus, comprising:
    selecting the images, to be processed, belonging to the second image group in ascending order of image size;
    generating a converted optical flow obtained by converting, in accordance with a size of a selection image currently selected, an optical flow corresponding to the image previously selected;
    generating a moved selection image obtained by moving each pixel of the selection image in accordance with the converted optical flow;
    obtaining, as an optical flow corresponding to a resolution of the selection image, an optical flow which minimizes an energy function based on a first difference between pixel values of pixels in the moved selection image and pixel value of pixels in the image having the same size as that of the selection image among the images belonging to the first image group and a second difference between the converted optical flow and a processed optical flow obtained by performing smoothing processing for the converted optical flow; and
    outputting an optical flow which indicates motion vectors of pixels between the first image and the second image and has been obtained by performing the hierarchical processing in which operations of the selection of the images, the generation of the converted optical flow, the generation of the moved selection image, and the obtainment of the optical flow are repeated in order of lower resolution.

19. A non-transitory computer-readable storage medium storing a computer program for causing a computer to function as:
    selecting the images, to be processed, belonging to the second image group in ascending order of image size;
    generating a converted optical flow obtained by converting, in accordance with a size of a selection image currently selected, an optical flow corresponding to the image previously selected;
    generating a moved selection image obtained by moving each pixel of the selection image in accordance with the converted optical flow;
    obtaining, as an optical flow corresponding to a resolution of the selection image, an optical flow which minimizes an energy function based on a first difference between pixel values of pixels in the moved selection image and pixel value of pixels in the image having the same size as that of the selection image among the images belonging to the first image group and a second difference between the converted optical flow and a processed optical flow obtained by performing smoothing processing for the converted optical flow; and
    outputting an optical flow which indicates motion vectors of pixels between the first image and the second image and has been obtained by performing the hierarchical processing in which operations of the selection of the images, the generation of the converted optical flow, the generation of the moved selection image, and the obtainment of the optical flow are repeated in order of lower resolution.

20. An image processing apparatus for, by performing an image processing using a first image group which includes a first image and at least one first reduced image obtained by reducing the first image and a second image group which includes a second image and at least one second reduced image obtained by reducing the second image, generating an optical flow which indicates motion vectors of pixels between the first image and the second image, the apparatus comprising:
    one or more hardware processors; and
    one or more memories which store instructions executable by the one or more hardware processors to cause the image processing apparatus to perform at least:
        generating, by converting a resolution of an optical flow generated based on the at least one first reduced image and the at least one second reduced image into a converted resolution, a converted optical flow having the converted resolution;
        generating a new optical flow having the resolution based on the converted optical flow, the first image, and the second image;
        generating the optical flow which indicates motion vectors of pixels between the first image and the second image by using the new optical flow, the first image, and the second image; and
    wherein, the generation of the new optical flow includes, extracting a motion vector group including a motion vector at coordinate position of interest in the converted optical flow and a plurality of motion vectors around the coordinate position of interest in the converted optical flow, and specifying a motion vector at the coordinate position of interest in the new optical flow based on the motion vector group, the first image, and the second image.

* * * * *